United States Patent [19]

Satake et al.

[11] Patent Number: 5,120,808
[45] Date of Patent: * Jun. 9, 1992

[54] POLY(ARYLENE THIOETHER) BLOCK COPOLYMER AND PRODUCTION PROCESS THEREOF

[75] Inventors: Yoshikatsu Satake, Iwaki; Shinji Yamamoto, Urawa; Takashi Kaneko, Tokyo; Masahito Tada, Matsudo; Ken Kashiwadate, Iwaki; Toshiya Mizuno, Tsuchiura; Hiroyuki Endo, Ibaraki; Takayuki Katto, Iwaki; Zenya Shiiki, Narashino, all of Japan

[73] Assignee: Kureha Kagaku Kogyo K.K., Tokyo, Japan

[ * ] Notice: The portion of the term of this patent subsequent to Dec. 4, 2007 has been disclaimed.

[21] Appl. No.: 424,624

[22] Filed: Oct. 20, 1989

[30] Foreign Application Priority Data

Oct. 25, 1988 [JP] Japan ................. 63-267290
Nov. 15, 1988 [JP] Japan ................. 63-286836
Sep. 26, 1989 [JP] Japan ................. 1-248083

[51] Int. Cl.$^5$ ................. C08G 75/14; C08L 81/04
[52] U.S. Cl. ................. 525/537; 525/388; 525/471
[58] Field of Search ................. 525/537, 471

[56] References Cited

U.S. PATENT DOCUMENTS

| | | | |
|---|---|---|---|
| Re. 32,595 | 2/1988 | Davies | 525/471 |
| 3,966,688 | 6/1976 | Campbell | 525/537 |
| 4,486,578 | 12/1984 | Asakura et al. | |
| 4,590,104 | 5/1986 | Zeiner et al. | |
| 4,690,972 | 9/1987 | Johnson et al. | |
| 4,698,415 | 10/1987 | Sinclair et al. | |
| 4,716,212 | 12/1987 | Gaughan et al. | |
| 4,745,167 | 5/1988 | Iizuka et al. | |
| 4,785,057 | 11/1988 | Shiiki et al. | 525/537 |
| 4,826,906 | 5/1989 | Satake et al. | |
| 4,960,555 | 10/1990 | Satake et al. | 525/537 |
| 4,960,841 | 10/1990 | Kawabata et al. | 525/537 |
| 4,962,143 | 10/1990 | Satake et al. | 525/537 |
| 4,975,479 | 12/1990 | Satake et al. | 524/100 |

FOREIGN PATENT DOCUMENTS

| | | |
|---|---|---|
| 270955 | 6/1988 | European Pat. Off. |
| 274754 | 7/1988 | European Pat. Off. |
| 280325 | 8/1988 | European Pat. Off. |
| 3405523 | 8/1985 | Fed. Rep. of Germany |
| 47-13347 | 7/1972 | Japan |
| 60-58435 | 4/1985 | Japan |
| 60-104126 | 6/1985 | Japan |
| 61-221229 | 10/1986 | Japan |

OTHER PUBLICATIONS

A. B. Port et al., *Polymer Degradation and Stability*, 2 (1980) pp. 1-22.
*Indian J. Chem.*, vol. 21A, May 1982, pages 501-502.
*Indian Journal of Pure and Applied Physics*, vol. 22, Apr. 1984, pages 247-240.
*Mol. Cryst. Liq. Cryst.*, vol. 83, 1982, pages 229-238.

*Primary Examiner*—Melvyn I. Marquis
*Assistant Examiner*—Helen F. Lee
*Attorney, Agent, or Firm*—Lowe, Price, LeBlanc & Becker

[57] ABSTRACT

Disclosed herein are a poly(arylene thioether) block copolymer alternately comprising (A) at least one poly(arylene thioether-ketone) block having predominant recurring units of the formula

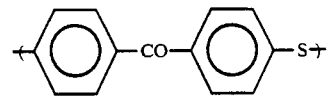

wherein the —CO— and —S— are in the para position to each other and (B) at least one poly(arylene thioether) block having predominant recurring units of the formula

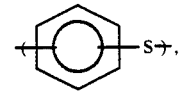

(a) the ratio of the total amount of the poly(arylene thioether) block (B) to the total amount of the poly(arylene thioether-ketone) block (A) being within a range of 0.05-5 by weight, (b) the average polymerization degree of the poly(arylene thioether) block (B) being at least 10, and (c) said block copolymer having a melt viscosity of 2-00,000 poises as measured at 350° C. and a shear rate of 1,200/sec as well as a production process the poly(arylene thioether) block copolymer. The invention also provides a stabilized poly(arylene thioether) block copolymer containing a basic compound either alone or in combination with an antioxidant.

6 Claims, No Drawings

POLY(ARYLENE THIOETHER) BLOCK COPOLYMER AND PRODUCTION PROCESS THEREOF

FIELD OF THE INVENTION

This invention relates to crystalline poly(arylene thioether) block copolymers having excellent melt stability, processability and handling properties, and more specifically to novel block copolymers containing at least one poly(arylene thioether-ketone) block having predominant recurring units of the formula

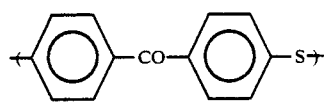

and at least one poly(arylene thioether) block having predominant recurring units of the formula

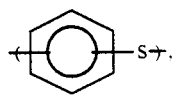

and also to a process for the production thereof.

This invention is also concerned with products formed or molded from the block copolymers. In addition, this invention also pertains to stabilized derivatives of the block copolymers.

BACKGROUND OF THE INVENTION

In the fields of the electronic and electrical industry and the automobile, aircraft and space industries, there is a strong demand in recent years for crystalline thermoplastic resins having high heat resistance of about 300° C. or higher in terms of melting point and moreover easy melt processability.

Recently, poly(arylene thioether-ketones) (hereinafter abbreviated as "PTKs") have drawn attention for their high melting points. Various studies are now under way thereon.

There are some disclosure on PTKs, for example, in Japanese Patent Laid-Open No. 58435/1985, German Offenlegungsschrift 34 05 523 Al, Japanese Patent Laid-Open No. 104126/1985, Japanese Patent Laid-Open No. 13347/1972, Indian J. Chem., 21A, 501-502 (May, 1982), Japanese Patent Laid-Open No. 221229/1986, U.S. Pat. No.4,716,212, U.S. Pat. No. 4,690,972, European Patent Publication No. 0,270,955 A2, European Patent Publication No. 0,274,754 A2, European Patent Publication No. 0,280,325 A2, etc.

Regarding the PTKs described in the above publications, neither molding nor forming has however succeeded to date in accordance with conventional melt processing techniques. Incidentally, the term "conventional melt processing techniques" as used herein means usual melt processing techniques for thermoplastic resins, such as extrusion, injection molding and melt spinning.

The unsuccessful molding or forming of PTKs by conventional melt processing techniques is believed to be attributed to the poor melt stability of the prior art PTKs, which tended to lose their crystallinity or to undergo crosslinking and/or carbonization, resulting in a rapid increase in melt viscosity, upon their melt processing.

The present inventors thus conducted an investigation with a view toward developing a process for economically producing PTKs having melt stability sufficient to permit the application of conventional melt processing techniques. The investigation led to the successful provision of PTKs having significantly improved heat stability upon melting (hereinafter called "melt stability") (Japanese Patent Laid-Open No. 54031/1989).

It has also found that the melt stability of the melt-stable PTKs upon melt processing can be improved further by the addition of a basic compound such as the hydroxide or oxide of a Group IA or Group IIA metal of the periodic table to them (Japanese Patent Application No. 142772/1988).

The melt-stable PTKs obtained as described above have a high melting point, typified by the extremely high melting point of the homopolymer which reaches as high as about 360 C. This is however not all good. Their melt processing temperatures are high accordingly, so that melt processing facilities for high-temperature processing are required. Further, a stringent temperature control is required to perform melt processing without deterioration by heat.

The melt-stable PTKS are generally obtained as fine powders having a particle size of approximately 5-20 $\mu$m. This has led to an additional problem upon their production such that they show poor handling properties in their collection step after polymerization, especially in filtration, washing, drying and transportation. Still further problems have also arisen such as poor metering property upon melt processing and occurrence of blocking in hoppers or the like.

OBJECTS AND SUMMARY OF THE INVENTION

An object of this invention is to provide polymers with improved processability and handling properties while retaining the excellent properties, such as heat resistance and crystallinity, of the aforementioned melt-stable PTKs as much as possible.

With a view toward improving the processability of a melt-stable PTK, the present inventors first of all attempted to lower the melting point, i.e., processing temperature of the melt-stable PTK by random copolymerization of its monomer with monomers of a kind different from the first-mentioned monomer. Namely, 4,4'-dihalobenzophenone as a dihalogenated aromatic compound was combined with dihalobenzenes as dihalogenated aromatic compounds of a kind different from 4,4'-dihalobenzophenone, respectively, followed by random copolymerization. However, the resultant random copolymers tended to have lower crystallinity and heat resistance and poorer melt stability as the proportions of the dihalobenzenes increased.

Further, dihalogenated benzophenones represented by 4,4'-dihalobenzophenones have been activated by the ketone group and have far higher reactivity compared to dihalobenzenes. They hence have extremely poor copolymerizability with dihalobenzenes.

The present inventors then attempted to produce a PTK-PATE block copolymer in which a poly(arylene thioether) (hereinafter abbreviated as "PATE") having recurring units of the formula

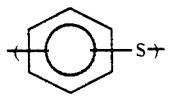

is incorporated as blocks in the chain of a melt-stable PTK. As a result, it has been found that a poly(arylene thioether) block copolymer having excellent processability and high crystallinity can be obtained by using as a prepolymer a PATE, which has a particular average polymerization degree and contains terminal thiolate groups and/or thiol groups as reactive terminal groups, and reacting the PATE prepolymer with a 4,4'-dihalobenzophenone and an alkali metal sulfide under specific conditions in an organic amide solvent.

It has also been found that a block copolymer having excellent properties can be obtained by reacting a PATE prepolymer with a PTK prepolymer.

It has also been uncovered that each of these block copolymer can be obtained as granules having good handling properties from its polymerization systems by a conventional collection method.

It has also been revealed that each of the block copolymers has high melt stability and various formed or molded products can be easily obtained from the block copolymer alone or its compositions.

It has also been found that a block copolymer of improved resistance to the reduction of melt stability and crystallinity can be obtained by adding a specific basic compound, optionally along with an antioxidant, to each of the above block copolymer.

The present invention has been brought to completion on the basis of these findings.

In one aspect of this invention, there is thus provided a poly(arylene thioether) block copolymer alternately comprising (A) at least one poly(arylene thioether-ketone) block having predominant recurring units of the formula

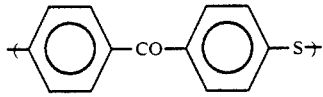

wherein the —CO— and —S— are in the para position to each other and (B) at least one poly(arylene thioether) block having predominant recurring units of the formula

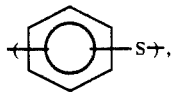

(a) the ratio of the total amount of the poly(arylene thioether) block (B) to the total amount of the poly(arylene thioether-ketone) block (A) ranging from 0.05 to 5 by weight,
(b) the average polymerization degree of the poly(arylene thioether) block (B) being at least 10, and
(c) said block copolymer having a melt viscosity of 2-100,000 poises as measured at 350° C. and a shear rate of 1,200/sec.

In another aspect of this invention, there is also provided a process for the production of a poly(arylene thioether) block copolymer comprising (A) at least one poly(arylene thioether-ketone) block and (B) at least one poly(arylene thioether) block, which comprises at least the following two steps:

(i) heating in the presence of water an organic amide solvent containing a dihalogenated aromatic compound, which consists principally of a dihalobenzene, and an alkali metal sulfide, whereby a reaction mixture containing a poly(arylene thioether) prepolymer having predominant recurring units of the formula

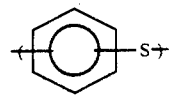

and reactive terminal groups is formed, and (ii) mixing the reaction mixture, which has been obtained in the step i), with a dihalogenated aromatic compound consisting principally of at least one dihalobenzophenone selected from 4,4'-dichlorobenzophenone and 4,4'-dibromobenzophenone, an alkali metal sulfide, an organic amide solvent and water and heating the resultant mixture to form a poly(arylene thioether-ketone) block having predominant recurring units of the formula

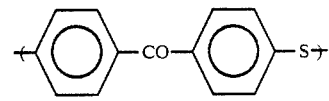

wherein the —CO— and —S— are in the par position to each other; said first and second steps (i) and (ii) being conducted under the following conditions (a)-(f):
(a) in the first step i), the ratio of the water content to the amount of the charged organic amide solvent being 0.2-5 (mol/kg), the ratio of the amount of the charged dihalogenated aromatic compound to the amount of the charged alkali metal sulfide being 0.8-1.05 (mol/mol), and the polymerization being conducted until the average polymerization degree of the poly(arylene thioether) prepolymer becomes at least 10,
(b) in the second step, the ratio of the water content to the amount of the charged organic amide solvent being controlled within a range of 2.5-15 (mol/kg),
(c) in the second step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step (i) and that charged in the second step ii), being controlled within a range of 0.95-1.2 (mol/mol),
(d) the ratio of the charged amount of the dihalogenated aromatic compound consisting principally of the dihalobenzophenone to the charged amount of the dihalogenated aromatic compound consisting principally of the dihalobenzene being controlled within a range of 0.1-10 (mol/mol),
(e) the reaction of the second (ii) being conducted within a temperature range of 150°-300° C. with the proviso that the reaction time at 210° C. and higher is not longer than 10 hours, and (f) in the second step ii), the reaction is conducted until the melt viscosity of the resulting block copolymer becomes 2-100,000 poises as measured at 350° C. and a shear rate of 1,200/sec.

In a further aspect of this invention, there is also provided a process for the production of a poly(arylene thioether) block copolymer comprising (A) at least one poly(arylene thioether-ketone) block and (B) at least one poly(arylene thioether) block, which comprises at least the following three steps:

(i) heating in the presence of water an organic amide solvent containing a dihalogenated aromatic compound, which consists principally of a dihalobenzene, and an alkali metal sulfide, whereby a first reaction mixture containing a poly(arylene thioether) prepolymer having predominant recurring units of the formula

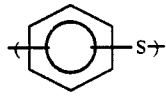

and reactive terminal groups is formed, (ii) heating in the presence of water an organic amide solvent containing a dihalogenated aromatic compound, which consists principally of at least one dihalobenzophenone selected from 4,4'-dichlorobenzophenone and 4,4'-dibromobenzophenone, an alkali metal sulfide, whereby a second reaction mixture containing a poly(arylene thioether-ketone) prepolymer having predominant recurring units of the formula

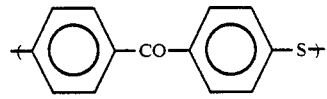

wherein the —CO— and —S— are in the para position to each other and reactive terminal groups is formed, and (iii) mixing and reacting the first reaction mixture, which has been obtained in the first step (i) and contains the poly(arylene thioether) prepolymer, with the second reaction mixture obtained in the second step (ii) and containing the poly(arylene thioetherketone) prepolymer;

said first through third steps (i)–(iii) being conducted under the following conditions (a)–(g):

(a) in the first step i), the ratio of the water content to the amount of the charged organic amide solvent being 0.2–5 (mol/kg), the ratio of the amount of the charged dihalogenated aromatic compound to the amount of the charged alkali metal sulfide being 0.8–1.05 (mol/mol), and the polymerization being conducted until the average polymerization degree of the poly(arylene thioether) prepolymer becomes at least 10, (b) in the second step, the ratio of the water content to the amount of the charged organic amide solvent being controlled within a range of 2.5–15 (mol/kg) and the reaction being conducted within a temperature range of 60°–300° C. with the proviso that the reaction time at 210° C. and higher is not longer than 10 hours, (c) in the third step, the ratio of the water content to the amount of the charged organic amide solvent being controlled within a range of 2.5–15 (mol/kg)

(d) in the third step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step i) and that charged in the second step ii), being controlled within a range of 0.95–1.2 (mol/mol), (e) the ratio of the whole poly(arylene thioether) prepolymer to the whole poly(arylene thioether-ketone) prepolymer being controlled at 0.05–5 by weight, (f) the reaction of the third step iii) being conducted within a temperature range of 150°–300° C. with the proviso that the reaction time at 210° C. and higher is not longer than 10 hours, and (g) in the third step iii), the reaction is conducted until the melt viscosity of the resulting block copolymer becomes 2-100,000 poises as measured at 350° C. and a shear rate of 1,200sec.

In a still further aspect of this invention, there is also provided a formed or molded product of the above-described poly(arylene thioether) block copolymer.

In a still further aspect of this invention, there is also provided a stabilized poly(arylene thioether) block copolymer comprising the poly(arylene thioether) block copolymer and per 100 parts by weight of the above poly(arylene thioether) block copolymer, 0.1–30 parts by weight of at least one basic compound selected from the group consisting of hydroxides, oxides and aromatic carboxylates of group IIA metals of the periodic table other than magnesium, and aromatic carboxylates, carbonates, hydroxides, phosphates, including condensation products, and borates, including condensation products, of group IA metals of the periodic table and 0-10 parts by weight of at least one antioxidant selected from the group consisting of hindered phenolic compounds, phosphorus compounds and hindered amine compounds.

In a still further aspect of this invention, there is also provided a formed or molded product of the above-described stabilized poly(arylen thioether) block copolymer.

DETAILED DESCRIPTION OF THE INVENTION

Features of the present invention will hereinafter be described in detail.

Poly(Arylene Thioether) Block Copolymers

Chemical structure of block copolymers

The poly(arylene thioether) block copolymers according to the present invention are block copolymers alternately comprising (A) at least one PTK block having predominant recurring units of the formula

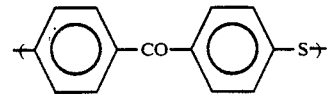

wherein the —CO— and —S— are in the para position to each other and (B) at least one PATE block having predominant recurring units of the formula

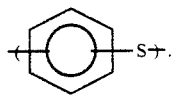

The block copolymer of the present invention can have a desired structure containing both blocks in an alternate order, such as (A)-[-(B)—(A)-]$_m$(B)—(A), m being 0 or an integer of 1 or greater or (A)-[-(B-)-]-(A)]$_n$(B), n being 0 or an integer of 1 or greater.

It is however required that the weight ratio of the total amount of blocks (B) to the total amount of blocks (A) be within a range of 0.05-5, preferably 0.1-4, more preferably 0.05-3.

The block (A) serves to impart high degrees of heat resistance and crystallinity to the block copolymer. On the other hand, the block (B) contributes to the reduction of the processing temperature and the granulation while maintaining the high crystallinity. Therefore, block copolymers in each of which the weight ratio of the total amount of blocks (B) to the total amount of blocks (A) is at least 0.05 but smaller than 1, preferably at least 0.1 but smaller than 1 feature particularly good heat resistance and high crystallinity. Ratios in a range of 1-5, preferably 1-4 give block copolymers excellent especially in processability while retaining excellent crystallinity. However, any weight ratios of the total amount of blocks (B) to the total amount of blocks (A) smaller than 0.05 are too small to achieve any sufficient reduction in processing temperature or the formation into granules. To the contrary, any ratios greater than 5 lead to a substantial reduction in heat resistance and disturb the balancing between heat resistance and processability. Ratios outside the above range are therefore not preferred.

It is essential for the block (B) to have an average polymerization degree of at least 10, preferably 20 or higher.

If the average polymerization degree of the block (B) is smaller than 10, the resulting block copolymer becomes similar to a random copolymer so that physical properties such as crystallinity, heat resistance and melt stability are all reduced substantially. Such small average polymerization degrees are therefore not preferred. In addition, any unduly small average polymerization degree of the block (B) leads to another problem that a block copolymer of high molecular weight can hardly be obtained.

The block (A) and block (B) can contain one or more recurring units other than their predominant recurring units of the formulae

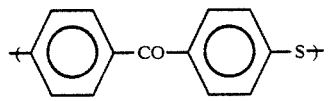

and

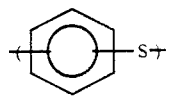

to an extent that the objects of this invention are not impaired.

Exemplary recurring units other than the above recurring units may include:

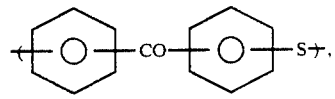

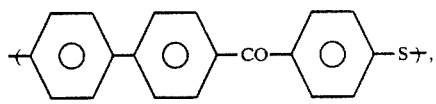

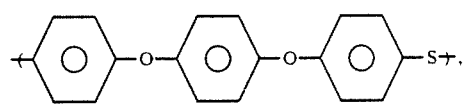

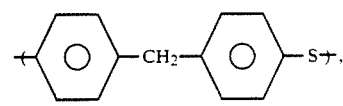

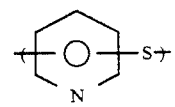

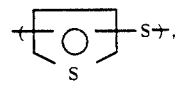

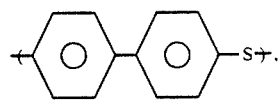

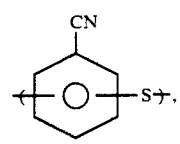

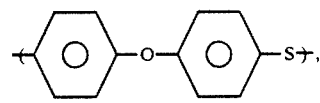

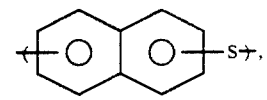

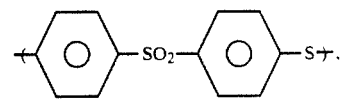

-continued

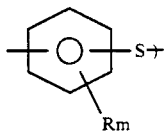

(wherein R means an alkyl group having 5 or less carbon atoms and m stands for an integer of 0–4.).

In general, these other recurring units can be introduced into the block copolymers by using the corresponding various dihalogenated aromatic compounds as comonomers.

Physical properties of the block copolymers

Physical properties and other characteristics of the poly(arylene thioether) block copolymers according to this invention will next be described in detail from the viewpoint of processability, melt stability, crystallinity and the like.

(1) Processability

The melting point of PTK homopolymer is about 360° C. The extent of a reduction in the melting point due to copolymerization with another monomer of a different kind, $\Delta Tm = [360°\ C. - Tm$ (melting point of copolymer)] is generally proportional to the extent of a reduction in the melt processing temperature. Accordingly, $\Delta Tm$ can be used as an index indicative of processing temperature reducing effect, namely, processability improving effect.

$\Delta Tm$ may preferably be 10°–80° C., more preferably 20°–70° C., most preferably 30°–60° C. If $\Delta Tm$ is lower than 10° C., there is a potential problem that the processability improving effect may not be sufficient. If $\Delta Tm$ is higher than 80° C., there is another potential problem that the block copolymer may lose the characteristics as a heat-resistant resin. $\Delta Tm$ outside the above range is therefore not preferred.

(2) Crystallinity

One of great features of the block copolymers according to this invention resides in that they have not only excellent processability but also high crystallinity. Crystallinity imparts high heat resistance to a copolymer. To have a block copolymer equipped with high heat resistance, it is essential that the block copolymer has sufficient crystallinity.

In general, melt crystallization enthalpy $\Delta Hmc$ is proportional to the degree of crystallization when a molten polymer undergoes crystallization. On the other hand, melt crystallization temperature Tmc serves as an index of the readiness of crystallization. Therefore, the melt crystallization enthalpy $\Delta Hmc$ (400° C.) and melt crystallization temperature Tmc (400° C.) of a block copolymer according to this invention as measured when cooled at a rate of 10° C./min immediately after being heated to 400° C. in an inert gas atmosphere by means of a differential scanning calorimeter (hereinafter abbreviated as "DSC") can be used as indices of the crystallinity of the block copolymer.

In addition, residual melt crystallization enthalphy, $\Delta Hmc$ (400° C./10 min) and melt crystallization temperature, Tmc (400° C./10 min) measurable upon determination of the residual crystallinity, both of which will be described subsequently, can be used as an index of not only melt stability but also crystallinity.

The block copolymers of this invention may have a melt crystallization enthalpy, $\Delta Hmc$ (400° C.) of at least 15 J/g, preferably at least 20 J/g, and more preferably at least 25 J/g. On the other hand, Tmc (400° C.) may desirably be at least 180° C., with at least 200° C. being more preferred. Block copolymers having $\Delta Hmc$ (400° C.) smaller than 15 J/g or Tmc (400° C.) lower than 180° C. may have insufficient heat resistance as heat resistant polymers and are hence not preferred. (3) Melt stability:

The greatest feature of the block copolymers according to this invention resides in that they have melt stability sufficient to permit the application of conventional melt processing techniques.

Polymers of poor melt stability tend to lose their crystallinity or to undergo crosslinking or carbonization, resulting in a rapid increase in melt viscosity, upon melt processing.

It is hence possible to obtain an index of the melt processability of a polymer by investigating the residual crystallinity of the polymer after holding it at an elevated temperature of its melt processing temperature or higher for a predetermined period of time. The residual crystallinity can be evaluated quantitatively by measuring the melt crystallization enthalpy of the polymer by a DSC.

Specifically, it is possible to use as indices of the melt stability of a block copolymer its residual melt crystallization enthalphy, $\Delta Hmc$ (400° C./10 min) and melt crystallization temperature, Tmc (400° C./10 min), which are determined at a cooling rate of 10° C./min after the block copolymer is held at 50° C. for 5 minutes in an inert gas atmosphere, heated to 400° C. at a rate of 75° C./min and then held for 10 minutes at 400° C. which is higher than the melt processing temperature of the block copolymer.

In the case of a copolymer having poor melt stability, it undergoes crosslinking or the like under the above conditions, namely, when it is held for 10 minutes at the high temperature of 400° C., whereby the copolymer loses its crystallinity substantially.

The block copolymers of this invention are polymers having the physical properties that their residual melt crystallization enthalpies, $\Delta Hmc$ (400° C./10 min) are at least 10 J/g, more preferably at least 15 J/g, most preferably at least 20 J/g and their melt crystallization temperatures, Tmc (400° C./10 min) are at least 170° C., more preferably at least 180° C., most preferably at least 190° C.

A block copolymer, whose $\Delta Hmc$ (400° C./10 min) is smaller than 10 J/g or whose Tmc (400° C./10 min) is lower than 170° C., tends to lose its crystallinity or to induce a melt viscosity increase upon melt processing, so that difficulties are encountered upon application of conventional melt processing techniques.

Further, the ratio of melt crystallization enthalpy to residual melt crystallization enthalpy, namely, $\Delta Hmc$ (400° C.)/$\Delta Hmc$ (400° C./10 min) can also be used as an index of melt stability. Deterioration by heat becomes smaller as this ratio decreases. Therefore, it is preferable that $\Delta Hmc$ (400° C./10 min) is at least 10 J/g and the above ratio is 5 or smaller, more preferably 3 or smaller.

(4) Melt viscosity:

In this invention, the melt viscosity $\eta^*$ of each copolymer is used as an index of its molecular weight.

Specifically, a polymer sample is filled in a Capirograph manufactured by Toyo Seiki Seisaku-Sho, Ltd.

and equipped with a nozzle having an inner diameter of 1 mm and an L/D ratio of 10/1 and is preheated at 350° C. for 5 minutes. Its melt viscosity $\eta^*$ is measured at a shear rate of 1,200sec.

The block copolymers of the present invention have a melt viscosity $\eta^*$ of 2–100,000 poises, preferably 5–50,000 poises, more preferably 10–30,000 poises.

Those having a melt viscosity $\eta^*$ lower than 2 poises have an unduly small molecular weight so that their flowability is too high to apply conventional melt processing techniques. Even if melt-formed or melt-molded products are obtained, their physical properties are considerably inferior. Such low melt viscosities are therefore not preferred. On the other hand, those having a melt viscosity $\eta^*$ higher than 100,000 poises have an unduly large molecular weight so that their flowability is too low to apply conventional melt processing techniques. Such high melt viscosities are therefore not preferred either.

Production Process of Block Copolymers

A variety of processes may be contemplated for the production of the block copolymers, for example, including:

(1) A dihalogenated aromatic compound consisting principally of a 4,4'-dihalobenzophenone and an alkali metal sulfide are added to and reacted with a PATE block (B) which has been prepared in advance, whereby a PTK block (A) is formed.

(2) A dihalogenated aromatic compound consisting principally of a dihalobenzene and an alkali metal sulfide are added to and reacted with a PTK block (A) which has been prepared in advance, whereby a PATE block (B) is formed.

(3) PTK block (A) and PATE block (B), which have been prepared separately, are chemically combined together.

The present inventors carefully studied those processes. As a result, it has been found that the processes (1) and (3) are suitable for obtaining the block copolymers of this invention.

A. Raw materials for block copolymers

In the process for the production of a block copolymer of this invention, an alkali metal sulfide and a dihalogenated aromatic compound employed as principal raw materials for the polymer and an organic amide solvent and water, including water of hydration, as reaction polymerization media.

(1) alkali metal sulfide

Illustrative examples of the alkali metal sulfide useful in the practice of this invention include lithium sulfide, sodium sulfide, potassium sulfide, rubidium sulfide, cesium sulfide and mixtures thereof.

These alkali metal sulfides may be used as a hydrate or aqueous mixture or in an anhydrous form. Especially, alkali metal sulfides in the form of a hydrate or aqueous mixture having a water content within the range specified in the present invention are advantageous in that a dehydration step prior to the polymerization step can be omitted.

Among these alkali metal sulfides, sodium sulfide is industrially preferred for its low price. An alkali metal sulfide which may be formed in situ in the reaction system can also be used.

From the viewpoint of an industrial raw material containing minimized impurities, crystalline sodium sulfide pentahydrate available commercially on the market can be used preferably. (2) Dihalogenated aromatic compound The dihalogenated aromatic compound employed in the present invention for the formation of the PTK block (A), including a PTK prepolymer, consists principally of one or more dihalobenzophenones, i.e., 4,4'-dichlorobenzophenone and/or 4,4'-dibromobenzophenone.

The dihalogenated aromatic compound used for the formation of the PATE block (B), including a PATE prepolymer, consists principally of a dihalobenzene such as p-dichlorobenzene or m-dichlorobenzene.

As other copolymerizable dihalogenated aromatic compounds, may be mentioned, for example, dihalobenzophenones other than 4,4'-isomers, dihaloalkylbenzenes, dihalobiphenyls, dihalodiphenyl sulfones, dihalonaphthalenes, bis(halogenated phenyl)methanes, dihalopyridines, dihalothiophenes and dihalobezonitriles, and mixtures thereof. As substituent halogen atoms, chlorine or bromine atoms may be used preferably from the economical viewpoint. Within a range not giving too much effects to the cost, a small amount of a fluorine compound, for example, difluorobenzophenone or the like may also be used in combination.

It is also permissible to produce a block copolymer, which has a partially crosslinked and/or branched structure, by causing a trihalogenated or higher polyhalogenated compound to exist in a reaction system in such a small amount that the processability and physical properties of the copolymer may not be impaired to any substantial extent. As illustrative examples of the trihalogenated or higher polyhalogenated compound usable for the above purpose, may be mentioned bis(dichlorobenzoyl)benzene, bis(dibromobenzoyl)benzene, trichlorobenzophenone, tribromobenzophenone, tetrachlorobenzophenone, tetrabromobenzophenone, trichlorobenzene, tribromobenzene, tetrachlorobenzene and the like, and mixtures thereof.

(3) Organic amide solvent

As reaction media useful for the production process of the block copolymers according to this invention, aprotic polar organic solvents having excellent heat stability and alkali resistance can be used. Of these, organic amide solvents, including carbamic amides, are preferred.

As such organic amide solvents, may be mentioned N-methylpyrrolidone, N-ethylpyrrolidone, hexamethylphosphoric triamide, tetramethylurea, dimethylimidazolidinone, dimethylacetamide, etc. They may also be used as a mixed solvent.

Among these organic amide solvents, N-methylpyrrolidone or its mixed solvent is particularly preferred from the viewpoint of the readiness in obtaining a melt-stable block copolymer, thermal and chemical stability, economy, etc.

B. Polymerization process and reaction conditions

To prepare the PATE prepolymer in this invention, any process conventionally known for the polymerization of PATE can be adopted. However, for the reaction in which the PTK is formed in the presence of the PATE prepolymer, for the preparation of the PTK prepolymer and for the reaction in which the PTK prepolymer and PATE prepolymer are combined together to form a block copolymer, it is necessary to conduct the reactions under special conditions, namely, by maintaining a high water content in the reaction systems, controlling the monomer compositions suitably, regulating the polymerization temperatures appropriately, and limiting reaction time at high temperatures. It is effective for the production of block copolymers having more preferable physical properties, for example, to choose a suitable material for the reactor and to apply stabilization treatment in a final stage of the reaction.

Unless these reaction conditions are suitably controlled, it is difficult to provide crystalline block copolymers having melt stability suitable for conventional melt processing.

Preparation processes of prepolymers (1) PATE prepolymer

The PATE prepolymer employed as a raw material for the block copolymer of this invention can be prepared by having an alkali metal sulfide and a dihalogenated aromatic compound, which consists principally of a dihalobenzene, undergo a dehalogenation/sulfuration reaction in the presence of water in an organic amide solvent under the following conditions (a)-(c):

(a) The ratio of the water content to the amount of the charged organic amide solvent is within a range of 0.2-5 (mol/kg), preferably 0.5-4.5 (mol/kg).

(b) The ratio of the amount of the charged dihalogenated aromatic compound to the amount of the charged alkali metal sulfide is within a range of 0.8-1.05 (mol/mol), preferably 0.8-1.0 (mol/mol), more preferably 0.85-0.95 (mol/mol).

(c) The reaction is conducted at a temperature within a range of 200°-280° C., preferably 210°-250° C., and should be continued until the average polymerization degree of the resulting prepolymer reaches at least 10, preferably 20 or greater.

When the ratio of the amount of the charged dihalogenated aromatic compound to the amount of the charged alkali metal sulfide is set at 0.95 or greater (mol/mol), notably, 1.0 or greater (mol/mol) as the above condition (b), the reaction product may be treated further with the alkali metal sulfide to prepare a PATE prepolymer containing more thiolate groups as reactive terminal groups. The PATE prepolymer may contain some crosslinked structure and/or branched structure introduced typically by allowing a trihalobenzene or higher polyhalobenzene to present in a small amount in the polymerization reaction system.

The PATE prepolymer is supposed to be a polymer having an average polymerization degree of at least 10, preferably at least 20 in view of the physical properties required for the block copolymer to be obtained.

In this invention, the number average molecular weight of the PATE block in the stage of the prepolymer is determined by applying the method which relies upon the numbers of terminal thiol groups, thiolate groups and terminal halogen atoms.

Incidentally, it is preferred from the standpoint of reactivity that the ratio of terminal thiolates, including thiol groups if any, to terminal halogen atoms in the PATE prepolymer chain is at least 0.3 (mol/mol), more preferably at least 0.5 (mol/mol). If this ratio is smaller than 0.3, the reactivity at the terminals of the PATE prepolymer is insufficient thereby to make it difficult to obtain a block copolymer.

In, passing, among the recurring units of the formula

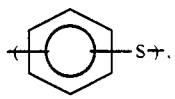

the paraphenylene sulfide unit of the formula

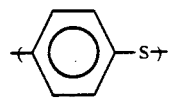

is preferred because it can afford block copolymers excellent especially from the viewpoint of crystallinity, melt stability, heat resistance, mechanical properties and the like.

(2) PTK prepolymer

The PTK prepolymer employed as a raw material for the block copolymer of this invention can be prepared in the following manner.

Namely, the PTK prepolymer can be prepared by having an alkali metal sulfide and a dihalogenated aromatic compound, which consists principally of 4,4'-dichlorobenzophenone and/or 4,4'-dibromobenzophenone, undergo a dehalogenation/sulfuration reaction in the presence of water in an organic amide solvent under the following conditions (a)-(b):

(a) The ratio of the water content to the amount of the charged organic amide solvent is within a range of 2.5-15 (mol/kg).

(b) The reaction is conducted at a temperature within a range of 60°-300° C. with the proviso that the reaction time at 210° C. and higher is not longer than 10 hours.

The PTK prepolymer may contain some crosslinked structure and/or branched structure introduced typically by allowing a trihalobenzophenone or higher polyhalobenzophenone to present in a small amount in the polymerization reaction system.

Production process of block copolymers (Process No. 1)

As a production process for each block copolymer according to this invention, may be described the process in which a PATE prepolymer is prepared in advance and at least one PTK block is formed in the presence of the PATE prepolymer. Practically, this process is the following two-step process:

A process for the production of a poly(arylene thioether) block copolymer comprising (A) at least one poly(arylene thioether-ketone) block and (B) at least one poly(arylene thioether) block, which comprises at least the following two steps:

(i) heating in the presence of water an organic amide solvent containing a dihalogenated aromatic compound, which consists principally of a dihalobenzene, and an alkali metal sulfide, whereby a reaction mixture containing a poly(arylene thioether) prepolymer having predominant recurring units of the formula

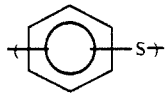

and reactive terminal groups is formed, and (ii) mixing the reaction mixture, which has been obtained in the step i), with a dihalogenated aromatic compound consisting principally of at least one dihalogenzophenone selected from 4,4'-dichlorobenzophenone and 4,4'-dibromobenzophenone, an alkali metal sulfide, an organic amide solvent and water and heating the resultant mixture to form a poly(arylene thioether-ketone) block having predominant recurring units of the formula

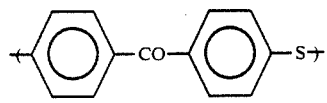

wherein the —CO— and —S— are in the para position to each other;

said first and second steps i) and ii) being conducted under the following conditions (a)-(f):

(a) in the first step i), the ratio of the water content to the amount of the charged organic amide solvent being 0.2-5 (mol/kg), the ratio of the amount of the charged dihalogenated aromatic compound to the amount of the charged alkali metal sulfide being 0.8-1.05 (mol/mol), and the polymerization being conducted until the average polymerization degree of the poly(arylene thioether) prepolymer becomes at least 10, (b) in the second step, the ratio of the water content to the amount of the charged organic amide solvent being controlled within a range of 2.5-15 (mol/kg), (c) in the second step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step i) and that charged in the second step (ii), being controlled within a range of 0.95-1.2 (mol/mol), (d) the ratio of the charged amount of the dihalogenated aromatic compound consisting principally of the dihalobenzophenone to the charged amount of the dihalogenated aromatic compound consisting principally of the dihalobenzene being controlled within a range of 0.1-10 (mol/mol), (e) the reaction of the second step ii) being conducted within a temperature range of 150°-300° C. with the proviso that the reaction time at 210° C. and higher is not longer than 10 hours, and (f) in the second step ii), the reaction is conducted until the melt viscosity of the resulting block copolymer becomes 2-100,000 poises as measured at 350° C. and a shear rate of 1,200sec.

Production process of block copolymers (Process No. 2)

As another production process for each block copolymer according to this invention, may be described the process in which PATE prepolymer and PTK prepolymers are prepared in advance and are then reacted to combine them together. This process is practically the following 3-step process:

A process for the production of a poly(arylene thioether) block copolymer comprising (A) at least one poly(arylene thioether-ketone) block and (B) at least one poly(arylene thioether) block, which comprises at least the following three steps:

(i) heating in the presence of water an organic amide solvent containing a dihalogenated aromatic compound, which consists principally of a dihalobenzene, and an alkali metal sulfide, whereby a first reaction mixture containing a poly(arylene thioether) prepolymer having predominant recurring units of the formula

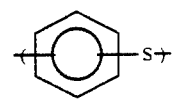

and reactive terminal groups is formed, (ii) heating in the presence of water an organic amide solvent containing a dihalogenated aromatic compound, which consists principally of at least one dihalobenzophenone selected from 4,4'-dichlorobenzophenone and 4,4'-dibromobenzophenone, an alkali metal sulfide, whereby a second reaction mixture containing a poly(arylene thioether-ketone) prepolymer having predominant recurring units of the formula

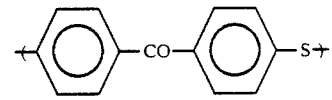

wherein the —CO— and —S— are in the para position to each other and reactive terminal groups is formed, and (iii) mixing and reacting the first reaction mixture, which has been obtained in the first step (i) and contains the poly(arylene thioether) prepolymer, with the second reaction mixture obtained in the second step (ii) and containing the poly(arylene thioetherketone) prepolymer;

said first through third steps (i)-(iii) being conducted under the following conditions (a)-(g):

(a) in the first step (i), the ratio of the water content to the amount of the charged organic amide solvent being 0.2-5 (mol/kg), the ratio of the amount of the charged dihalogenated aromatic compound to the amount of the charged alkali metal sulfide being 0.8-1.05 (mol/mol), and the polymerization being conducted until the average polymerization degree of the poly(arylene thioether) prepolymer becomes at least 10, (b) in the second step, the ratio of the water content to the amount of the charged organic amide solvent being controlled within a range of 2.5-15 (mol/kg) and the reaction being conducted within a temperature range of 60°-300° C. with the proviso that the reaction time at 210° C. and higher is not longer than 10 hours, (c) in the third step, the ratio of the water content to the amount of the charged organic amide solvent being controlled within a range of 2.5-15 (mol/kg)

(d) in the third step, the ratio of the total amount of the charged dihalogenated aromatic compound, said total amount being the amount of the whole dihalogenated aromatic compounds including the dihalobenzene and the dihalobenzophenone to the total amount of the charged alkali metal sulfide, said latter total amount being the total amount of the alkali metal sulfide charged in the first step i) and that charged in the second step (ii), being controlled within a range of 0.95-1.2 (mol/mol), (e) the ratio of the whole poly(arylene thioether) prepolymer to the whole poly(arylene thioether-ketone) prepolymer being controlled at 0.05-5 by weight, (f) the reaction of the third step iii) being conducted within a temperature range of 150°-300° C. with the proviso that the reaction time at 210° C. and higher is not longer than 10 hours, and (g) in the third step (iii), the reaction is conducted until the melt viscosity of the resulting block copolymer becomes 2-100,000 poises as measured at 350° C. and a shear rate of 1,200sec.

Reaction conditions

The reaction conditions employed in the synthesis stages of the PTK prepolymer and block copolymer, said reaction conditions being essential features of the process of this invention for the production of the block copolymer, will hereinafter be described in further detail.

(1) Water content

In each of the processes for the preparation of the PTK prepolymer and block copolymer of this invention, the water content in the reaction system may desirably be within a range of 2.5-15 moles, preferably 3.5-14 moles per kg of the amount of the charged organic amide solvent.

Water contents lower than 2.5 moles can hardly provide a PTK prepolymer or block copolymer having high melt stability and moreover tend to induce decomposition in the polymerization reactions. On the other hand, water contents higher than 15 moles result in a reduction in the reaction rates so that PTK prepolymer and block copolymer having a low polymerization degrees are only available.

In order to adjust the water content in a reaction system, the water content may be reduced by distillation or the like or may be increased by adding water prior to the initiation of a polymerization reaction.

(2) Composition of monomers charged

The ratio of the total amount of the charged dihalogenated aromatic compound to the total amount of the charged alkali metal sulfide is of primary importance with respect to the composition of charges in the process of this invention for the production of the block copolymer.

Here, the term "the total amount of the charged alkali metal sulfide" means the sum of the amount of the alkali metal sulfide charged upon synthesis of the PTK prepolymer and/or the PATE prepolymer and the amount of the alkali metal sulfide charged upon synthesis of the block copolymer.

The ratio of the total amount of the dihalogenated aromatic compound to the total amount of the alkali metal sulfide, both charged upon synthesis of the block copolymer, may desirably be in a range of 0.95-1.2 (mol/mol), more preferably 0.97-1.10 (mol/mol), most preferably 0.98-1.05 (mol/mol).

Ratios smaller than 0.95 can hardly provide a block copolymer having excellent melt stability and tend to induce decomposition during the reaction. On the other hand, ratios greater than 1.2 can only provide a block copolymer having a low molecular weight. Accordingly, such small or large ratios are not preferred.

When a block copolymer is synthesized using only a portion or portions of synthesized PTK prepolymer and/or PATE prepolymer, the amounts of the alkali metal sulfide and dihalogenated aromatic compound charged upon synthesis of each prepolymer must be taken into consideration.

Regarding the ratio of the amount of the charged organic amide solvent to the amount of the charged alkali metal sulfide in the composition of charges, it is desirable to charge the organic amide solvent in an amount of 0.3-5 kg, more preferably 0.5-3 kg per mole of the amount of the charged alkali metal sulfide. If the amount of the charged organic amide solvent is less than 0.3 kg/mol, the viscosity of the reaction system increases to render the stirring difficult, whereby decomposition reactions tend to occur due to localized heating. On the other hand, any amounts of the charged organic amide solvent greater than 5 kg/mol result in poor productivity of the polymer per volume of the reactor and are hence economically disadvantageous. It is therefore necessary to control the ratio of the total amount of the charged organic amide solvent to the total amount of the charged alkali metal sulfide upon synthesis of the block copolymer, too.

Where the alkali metal sulfide is lost by a distilling operation or the like prior to the initiation of the reaction, the term "the amount of the charged alkali metal sulfide" as used herein means the remaining amount which is obtained by subtracting the loss from the amount actually charged. Furthermore, the term "the amount of the charged dihalogenated aromatic compound" as used herein should be interpreted not to include the amount of the halogen-substituted aromatic compound added in the final stage of the reaction for effecting a stabilizing treatment to be described subsequently.

(3) Reaction temperature and reaction time

In the process of this invention for the preparation of the PTK prepolymer, the reaction is conducted at a temperature within a range of 60°-300° C., with 150°-290° C. being preferred and 220°-280° C. more preferred.

If the reaction temperature is lower than 60° C., it takes an unduly long period of time to obtain the PTK prepolymer. This is certainly disadvantageous from the economical viewpoint. On the other hand, any reaction temperatures higher than 300° C. are difficult to obtain a PTK prepolymer having excellent melt stability and moreover, involve a potential danger of decomposition during the reaction.

In the process of this invention for the production of the block copolymer, the reaction is conducted at a temperature in a range of 150°-300° C., preferably 200°-290° C., and more preferably 210°-280° C.

Reaction temperatures lower than 150° C. require an unduly long time to obtain the block copolymer and are therefore economically disadvantageous. On the other hand, reaction temperatures higher than 300° C. can hardly obtain the block copolymer in a form excellent in melt stability and moreover involve a potential problem of decomposition during the reaction.

The polymerization time required for obtaining a PTK prepolymer or block copolymer of a desired molecular weight becomes shorter as the polymerization temperature increases but becomes longer as the polymerization temperature decreases. Accordingly, It is generally advantageous to conduct the polymerization at a temperature of 210° C. or higher from the viewpoint of productivity. It is however not preferred to conduct the reaction at a temperature of 210° C. or higher for 10 hours or longer, because a PTK prepolymer or block copolymer having excellent melt stability can hardly be obtained under such conditions.

In the present invention, the polymerization reaction is therefore carried out at a temperature within the range of 150°–300° C. and the reaction time at 210° C. and higher is controlled within 10 hours.

(4) Reactor:

In the process of this invention for the production of each of the PTK prepolymer and block copolymer, it is preferable to use, as a reactor (including equipment employed for provisional procedures of the polymerization reaction, for example, those required for dehydration and the like), a reactor which is made of a corrosion-resistant material at least at portions with which the reaction mixture is brought into direct contact. The corrosion-resistant material is supposed to be inert so that it does not react with the reaction mixture.

Preferable examples of the corrosion-resistant material include titanium materials such as titanium and titanium-containing alloys, nickel-containing corrosion-resistant materials such as Hastelloy C (a heat-resistant nickel alloy made by Haynes Stellite Company; nickel-molybdenum-chromium-iron-alloy containing about 55–60% of nickel, about 15–19% of molybdenum, about 13–16% of chromium) and austenitic steels (for example, "Carpenter 20", a special austenitic steel containing about 28–38% of nickel, about 19–21% of chromium and about 3–4% of copper and further, molybdenum, etc. in addition to iron.). Of these, it is particularly preferred to use a reactor lined with a titanium material.

The use of a reactor made of a corrosion-resistant material such as that described above makes it possible to obtain PTK prepolymer and block copolymer having high heat resistance and molecular weight.

(5) Treatment in the final stage of the reaction

Although a melt-stable block copolymer can be obtained by the above-described production process, the block copolymer can be obtained in a form improved further in melt stability by adding a certain kind of halogen-substituted aromatic compound to the reaction system and causing it to undergo a reaction in a final stage of the reaction.

Here, it should be noted that the term "final stage of the reaction" as used herein means a period after the lapse of about one third of the overall period of a reaction from the initiation thereof Further, the amount of the halogen-substituted aromatic compound charged in the final stage of the reaction is not included in the above-described amount of the charged dihalogenated aromatic compound.

As the halogen-substituted aromatic compound useful for the stabilizing treatment in the final stage of the reaction, it is preferable to use at least one halogen-substituted aromatic compound which contains at least one group having electronwithdrawing property at least equal to —CO— group.

Illustrative examples of such a halogensubstituted aromatic compound may include bis(chlorobenzoyl)-benzenes, bis(polychlorobenzoyl)benzenes, bis(-bromobenzoyl)benzenes, bis(polybromobenzoyl)benzenes, 4,4'-dichlorobenzophenone, 4,4'-dibromobenzophenone, dichlorobenzophenones other than the 4,4'-isomer, dibromobenzophenones other than the 4,4-isomer, difluorobenzophenones, dichlorodiphenylsulfones, dibromodiphenylsulfones, monochlorobenzophenones, monobromobenzophenones, monofluorobenzophenones, chloroacetophenones, dichloroacetophenones, chloronitrobenzenes and the like, and mixtures thereof.

Of these, 4,4'-dichlorobenzophenone and/or 4,4'-dibromobenzophenone employed as a monomer has excellent effects for the improvement of the melt stability, permits easy collection and purification of the thus-used organic amide solvent after the reaction and moreover, is economical. They are hence particularly preferred.

The halogen-substituted aromatic compound, which is used to effect the treatment in the final stage of the reaction, may desirably be added in an amount of 0.1–100 moles, preferably 0.5–20 moles, more preferably 1–10 moles per 100 moles of the charged alkali metal sulfide. If it is added in any amounts smaller than 0.1 mole, it shows little effects for the improvement of the melt stability. Even if it is added in any amounts greater than 100 moles on the contrary, its improving effects tend to reach saturation. It is hence not economical to use it in such a large amount.

It is desirable to conduct the final-stage treatment by adding the above-mentioned halogen-substituted aromatic compound to the polymerization reaction system in the final stage of the reaction and then allowing it to react at 60°–300° C., more preferably 150°–290° C., most preferably 220°–280° C. for 0.1–20 hours, more preferably 0.1–8 hours. There is a potential problem that the reaction may not proceed sufficiently when the reaction temperature is lower than 60° C. or when the reaction time is shorter than 0.1 hour. On the other hand, there is another potential problem that the melt stability of the block copolymer is reduced conversely when the reaction temperature is higher than 300° C. or when the reaction time is longer than 20 hours. Such reaction temperatures and times are hence not preferred.

(6) Conditions for the granulation:

Another principal feature of the process of this invention for the production of the block copolymer resides in that the block copolymer can be obtained as granules by suitably choosing the aforementioned reaction conditions for the block copolymer further. Reaction conditions for obtaining at least 50 wt.% of the resulting block copolymer as granules collectable by means of a sieve having an opening size of 75 μm (200 mesh) will next be described in further detail. (i) Weight ratio of the total amount of block or blocks (B) to the total amount of block or blocks (A) in the block copolymer:

The weight proportion of block or blocks (B) in the block copolymer is an important parameter since each block (B) contributes to the granulation. When it is desired to obtain the block copolymer of this invention as granules, it is necessary to control the ratio of the total amount of block or blocks (B) to the total amount of block or blocks (A) at 0.2 or greater, preferably 0.3 or greater, more preferably 0.4 or greater, all by weight.

If this ratio is smaller than 0.2, it becomes difficult to obtain the block copolymer as granules. On the contrary, ratios greater than 5 however lead to a substantial reduction in the heat resistance of the block copolymer. Such small and high ratios are both not preferred.

(ii) Reaction temperature and time for the granulation

To obtain the block copolymer as granules, it is desirable to raise the reaction temperature to at least 240°–290° C., preferably 250°–280° C. in the course of the reaction or in a final stage of the reaction.

Reaction temperatures lower than 240° C. make it difficult to obtain the block copolymer as granules. On the other hand, it is difficult to obtain the block copolymer in a form excellent in melt stability if the reaction temperature is higher than 290° C.

The time required for obtaining the block copolymer as desired granules becomes shorter as the reaction temperature increases. Conversely, it becomes longer as the reaction temperature decreases. Therefore, it is generally advantageous from the viewpoint of productivity to conduct the reaction at a high temperature of 250° C. or higher. It however becomes difficult to obtain the PTK prepolymer or block copolymer in a form excellent in melt stability if the reaction at high temperatures of 250° C. and higher is continued for 7 hours or longer.

C. Collection of block copolymers

To collect the block copolymer from the reaction mixture, the following method can be followed. Namely, after completion of the reaction including the treatment in the final stage if applied, the reaction mixture is subjected to flushing and/or distillation whereby the solvent is removed either partly or wholly to concentrate the reaction mixture. If necessary, the concentrate may be heated to remove any remaining solvent. The resulting solids or concentrate is washed with water and/or an organic solvent to eliminate soluble components such as salts formed in the reaction. The residue is again dried under heat to collect the polymer.

By suitably choosing the reaction conditions in the process of this invention for the production of the block copolymer, at least 50 wt.% of the resulting block copolymer can be obtained as granules which can be captured on a screen having an opening size of 75 μm (200 mesh), more preferably 106 μm (140 mesh), most preferably 150 μm (100 mesh).

As has been described above, the block copolymer can be easily collected as granules by a screen or the like from the reaction mixture after completion of the reaction. The granular polymer thus collected is washed with water and/or an organic solvent and then dried under heat to obtain it in a dry form. Since the block copolymer is in a granular form and has excellent handling property, it permits easy separation, water washing, transportation, metering and the like.

(Stabilized block copolymers

Addition of a particular basic compound to the poly(arylene thioether) block copolymers of this invention makes it possible to reduce or prevent the melt viscosity increase, and crystallinity reduction, the deposition of thermal decomposition products at resin-stagnating portions of a melt-processing apparatus due to thermal modification and/or thermal deterioration upon melt processing. Further, when the basic compound is used in combination with a specific antioxidant, these stabilizing effects are enhanced further.

The basic compound is non-oxidative and has heat resistance and low volatility. Specific examples include hydroxides, oxides and aromatic carboxylates of group IIA metals of the periodic table other than magnesium, and aromatic carboxylates, carbonates, hydroxides, phosphates, including condensation products thereof, and borates, including condensation products thereof, of group IA metals of the periodic table.

Among these basic compounds, the hydroxides and oxides of calcium and barium, and the lithium, sodium and potassium salts of aromatic carboxylic acids such as naphthalene mono- or poly-carboxylic acids, arylbenzoic acids, benzene mono- or poly-carboxylic acids, and hydroxybenzoic acid are preferred. Of these, calcium hydroxide and barium hydroxide are particularly preferred.

The basic compound may be added in an amount of 0.1–30 parts by weight, preferably 0.2–25 parts by weight, more preferably 0.3–20 parts by weight per 100 parts by weight of the poly(arylene thioether) block copolymer. If the proportion of the basic compound is smaller than 0.1 part by weight, its stabilizing effect cannot be brought about sufficiently. On the other hand, any proportions greater than 30 parts by weight have a potential problem such that the block copolymer may be decomposed or its electrical characteristics may be deteriorated.

As the antioxidant usable in combination with the basic compound, there is a radical chain terminating agent, peroxide decomposer or the like. Specific examples include hindered phenolic compounds, phosphorus compounds and hindered amine compounds.

As typical hindered phenolic compounds, may be mentioned 1,3,5-trimethyl-2,4,6-tris-(3,5-di-t-butyl-4-hydroxybenzyl) benzene and its analogous compounds, octadecyl 3-(3,5-di-t-butyl-4-hydroxyphenyl)propionate, pentaerythrityl tetrakis[3-(3,5-di-t-butyl-4-hydroxyphenyl) propionate], 2,2-thiodiethylenebis [3-(3,5-di-t-butyl-4-hydroxyphenyl)propionate].

As phosphorus compounds, those containing a trivalent phosphorus atom can be used preferably.

Of trivalent phosphorus compounds, representative examples include tris(2,4-di-t-butylphenyl) phosphite, bis-(2,6-di-t-butyl-4-methylphenyl)pentaerythritol diphosphite, distearyl pentaerythritol diphosphite, tetrakis(2,4-di-t-butylphenyl) 4,4'biphenylenediphosphinate.

Representative examples of the hindered amine compound include poly[[6-(1,1,3,3-tetramethylbutyl)imino-1,3,5-triazin-2,4-diyl] [(2,2,6,6-tetramethyl-4-piperidyl)imino]hexamethylene [(2,2,6,6-tetramethyl-4-piperidyl)imino] and its analogous compounds.

As antioxidants, those having low volatility and decomposability are preferred. In particular, the phosphorus compound referred to above can be used preferably. These antioxidants may be used either singly or in combination. When two or more antioxidants are used in combination, the combination of a radical chain terminating agent and a peroxide decomposer is preferred.

The antioxidant may be added in an amount of 0-10 parts by weight, preferably 0.05-5 parts by weight, more preferably 0.1-3 parts by weight per 100 parts by weight of the poly(arylene thioether) block copolymer. If the antioxidant is added in an amount smaller than 0.05 part by weight, its stabilizing effect cannot be brought about sufficiently. On the other hand, any amounts greater than 10 parts by weight involve a potential danger such that more gas components may be formed or electrical and other characteristics may be deteriorated. (Formed and molded products)

The poly(arylene thioether) block copolymers and stabilized poly(arylene thioether) block copolymers of this invention can be formed or molded into various products by conventional melt-processing techniques.

Extruded molded products

Various extruded products can be obtained, for example, by charging a block copolymer of this invention into an extruder equipped with a shaping die or nozzle in air or preferably in an inert gas atmosphere, extruding and shaping the block copolymer at a cylinder temperature of 300°-420° C. and an average intracylinder resin residence time of 0.5-60 minutes, preferably 2-30 minutes, and if necessary annealing the extrudates at 150°-350° C. for 0.1-100 hours.

Injection-molded products

Various injection-molded products can be obtained, for example, by charging a block copolymer of this invention into an injection molding machine equipped with a mold in air or preferably in an inert gas atmosphere, injection-molding the block copolymer at a cylinder temperature of 300°-420° C., a mold temperature of 50°-230° C., an average intracylinder resin residence time of 1-3,000 seconds, preferably 3-1,000 seconds, an injection holding pressure of 10-104 kg/cm$^2$ and an injection cycle of 1-3,000 seconds, and if necessary annealing the thus-injected products at 150°-350° C. for 0.1-100 hours.

Unstretched films

An unstretched film can be obtained, for example, by charging a block copolymer of this invention into an extruder equipped with a T-die in air or preferably in an inert gas atmosphere and meltextruding it into a film-like shape (T-die process) or pressing the block copolymer into a film-like shape on a high-temperature press while heating it in a molten state (hot pressing), and if necessary, heat-setting the resultant film for 1-3,000 seconds at a temperature of 160°-350° C. under a stress (pressure) while limiting distortions within ±20%, and if necessary further heat-relaxing the heat-set film at 150°-340° C. for 1-3,000 seconds under substantially no stress. It is also possible to obtain an unstretched film by subjecting the poly(arylene thioether) block copolymer to blown-film extrusion or compression molding. A block copolymer of the present invention can also be combined with one or more other resins to form a multilayer film.

Unstretched films according to this invention generally have an average thickness of 0.5-5,000 μm, preferably 1-3,000 μm.

Incidentally, it is preferred that such extruder, injection-molding machine and T-die equipped extruder be made of a corrosion-resistant metal at portions where they may be brought into contact with the resin melt. Preferably, they should be vented.

Other melt-formed or melt-molded products

From the block copolymers according to this invention, formed or molded hollow products such as bottles, tanks, pipes and tubes can be obtained by blow molding or the like. By pultrusion or the like, elongated products such as plates, pipes, rods and profiles can also be obtained from them.

Application fields

The block copolymers of the present invention are crystalline and permit the application of conventional melt processing techniques. They can be formed or molded into various heat-resistant products and can then be used in various fields.

For example, extrusion products may include sheets, plates, pipes, tubes, covered conductors, etc. Injection-molded products may be used as electronic and electric parts, car parts, etc. On the other hand, unstretched films may be employed as base films for magnetic recording, capacitor films, printed circuit boards, insulating films, prepreg sheets, and so on.

ADVANTAGES OF THE INVENTION

The present invention can economically provide poly(arylene thioether) block copolymers which have excellent heat resistance, processability and handling property and are crystalline. The invention can also provide stabilized poly(arylene thioether) block copolymers. The invention can also provide various formed or molded products of such poly(arylenethioether) block copolymers.

EMBODIMENTS OF THE INVENTION

The present invention will hereinafter be described in further detail by the following examples and comparative examples. It should however be borne in mind that the present invention is not limited only to the following examples.

EXAMPLE 1

Production Process No. 1

Synthesis of PATE prepolymer

A titanium-lined reactor was charged with 3.2 kg of hydrated sodium sulfide (water content: 54.0 wt.%) and 6.5 kg of N-methylpyrrolidone (hereinafter abbreviated as "NMP"). While gradually heating the contents to 203° C. in a nitrogen gas atmosphere, 2.45 kg of an NMP solution, which contained 1.358 kg of water, and 13.4 g of hydrogen sulfide were distilled out. Thereafter, 0.142 kg of water was added. A liquid mixture consisting of 2.443 kg of p-dichlorobenzene (hereinafter abbreviated as "PDCB") and 3.82 kg of NMP was then fed, followed by polymerization at 220 C for 10 hours (PDCB/sodium sulfide =0.9 mol/mol; water content/NMP =3.1 mol/kg), whereby about 13.6 kg of a reaction slurry (S$_1$) containing a prepolymer (P$_1$) for poly(p-phenylene thioether) (hereinafter abbreviated as "PPTE") were obtained.

A portion of the reaction slurry was sampled out, and the amount of remaining PDCB, terminal thiolate groups, terminal thiol groups and terminal chlorine groups were measured respectively by methods which will be set out subsequently.

The amount of PDCB remaining in the reaction slurry as determined by gas chromatography was 0.3 wt.% of the charged amount. The concentration of terminal thiolate groups and terminal thiol groups was $439 \times 10^{-6}$ equivalent per gram of Prepolymer $P_1$, while the concentration of terminal chlorine groups was $29 \times 10^{-6}$ equivalent per gram of Prepolymer $P_1$. The number average molecular weight of Prepolymer $P_1$ as determined from the numbers of those terminal groups was 4274 (average polymerization degree: 40).

Analytical methods

Analysis of terminal thiol groups or thiolate groups

Immediately after completion of the polymerization of the prepolymer, a portion of the reaction slurry was sampled out and then poured into water to have the prepolymer precipitated. The prepolymer was collected by filtration, washed in distilled water and then treated with dilute hydrochloric acid, whereby terminal thiolate groups were converted into thiol groups. The resulting prepolymer was washed for 30 minutes in distilled water and for additional 30 minutes in acetone and then dried at room temperature under reduced pressure in a vacuum drier, thereby obtaining a prepolymer sample. Right after that, about 10 mg to 1 gram of the prepolymer was weighed and placed in a stopper-equipped test tube, followed by the addition of 2.5 ml of an acetone solution consisting of 2.5 m% of acetone and 50 mmol of iodoacetamide. The test tube was hermetically closed and then heated at 100° C. for 60 minutes. The test tube was thereafter cooled with water and opened. The liquid-phase portion was separated. The absorbance at 450 nm (i.e., the absorbance of iodine) was measured by means of a spectrophotometer. Using a calibration curve prepared in advance with respect to the thiol compound

as a standard, the concentration of terminal thiol groups was calculated from the absorbance. (The amount of each sample should be chosen suitably so that the concentration of thiol groups in a corresponding acetone slurry falls within a range of 0.1– 0.3 mmol.) Analysis was conducted three times on the same dried sample to determine the average value of the concentration of terminal thiol groups.

Analysis of terminal halogen groups

Quantitative analysis of terminal halogen atoms was conducted using an X-ray fluorescence analyzer (model: "3080E2"; manufactured by Rigaku Denki Kabushiki Kaisha).

Determination of number average molecular weight

Each number average molecular weight was determined from the data of terminal thiol groups, including thiolate groups, and halogen groups in accordance with the following equation:

$$\text{Number average molecular weight} = \frac{\text{Sample weight (g)}}{\frac{1}{2}(\text{Number of terminal thiol groups} + \text{Number of terminal halogen groups})}$$

In addition, from each number average molecular weight, its corresponding average polymerization degree was calculated.

Synthesis of block copolymer

A titanium-lined 20-l reactor was charged with 247.7 g of hydrated sodium sulfide (water content: 54.0 wt.%), 688 g of 4,4'-dichlorobenzophenone (hereinafter abbreviated as "DCBP"), 8.212 kg of the reaction slurry ($S_1$) described above, 2.93 kg of NMP and 1.09 kg of water. After the reactor being purged with nitrogen gas, the contents were heated to 260 C at which they were polymerized for 2 hours.

The reaction conditions upon synthesis of the block copolymer were as follows:

(1) The molar ratio of the total amount of the charged dihalogenated aromatic compounds [the sum of the amount of PDCB charged upon synthesis of the prepolymer ($P_1$) and the amount of DCBP charged upon synthesis of the block copolymer] to the total amount of the charged alkali metal sulfide [the sum of the amount of effective sodium sulfide charged upon synthesis of the prepolymer ($P_1$) and the amount of sodium sulfide charged upon synthesis of the block copolymer] was 1.01.

(2) The ratio of the amount of DCBP to the amount of PDCB charged upon synthesis of the prepolymer ($P_1$), was about 0.47 (=32/68) by weight and about 0.28 by mole.

(3) The ratio of the water content to the organic amide (NMP) was about 10 mol/kg.

Collection of block copolymer

The resultant reaction mixture in the form of a slurry was diluted with a substantially equiamount of NMP and the granular polymer thus obtained was collected by a screen having an opening size of 150 μm (100 mesh). The polymer was washed three times with NMP and further three times with water, and then dried at 100° C. for 24 hours under reduced pressure to obtain a block copolymer ($B_1$). The collection rate of the block copolymer ($B_1$) was 80%.

Inherent properties of Block Copolymer $B_1$)

The block copolymer ($B_1$) was in the form of pearl-like granules having an average size of 711 μm and had a bulk density of 0.58 g/dl.

By an infrared (IR) spectrum analysis, a strong absorption peak attributed to ketone group was observed at $1640 \text{ cm}^{-1}$. Wide angle X-ray diffraction which was conducted using "RAD-B System" manufactured by Rigaku Denki Kabushiki Kaisha showed a diffraction pattern corresponding to the block copolymer, said pattern being apparently different from that corresponding PATE homopolymer or PTK homopolymer or a blend thereof.

The content of sulfur in Block Copolymer $B_1$ was determined by the combustion flask method and ion chromatography (IC method). Namely, Block Copolymer $B_1$ was caused to burn in a flask and the resulting combustion gas was absorbed in aqueous hydrogen peroxide solution, whereby the sulfur content of the block copolymer was converted into sulfate groups. The sulfur content was then quantitatively analyzed using an ion chromatographic apparatus equipped with an electrical conductivity detector ("IC-500"; manufactured by Yokogawa Electric Corporation).

The weight fraction $W_b$ (wt.%) of the recurring units

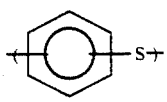

in the block copolymer can be calculated in accordance with the following equation:

$$W_b = 100 \times \frac{\text{Weight fraction of sulfur in block copolymer, } (W) - \text{Weight fraction of sulfur in PTK recurring unit, } (W_1)}{\text{Weight fraction of sulfur in PATE recurring unit, } (W_2) - \text{Weight fraction of sulfur in PTK recurring unit, } (W_1)}$$

By introducing a measured value $W = 25.3\%$ and calculated values $W_1 = 15.01\%$ and $W_2 = 29.63\%$ into the above equation, $W_b$ was determined to be 70%.

Physical properties of block copolymer

The melt viscosity of Block Copolymer $B_1$ was 250 poises. Tmc and $\Delta$Hmc are shown in Table 1.

EXAMPLES 2–8

Production Process No. 1

Synthesis of PATE prepolymer

A reaction slurry ($S_2$) containing Prepolymer $P_2$ of poly(p-phenylene thioether) (PPTE) was obtained in the same manner as in Example 1. The number average molecular weight of Prepolymer $P_2$ was 3760 (average polymerization degree: 35).

Syntheses of Block Copolymers $B_2$–$B_8$)

Polymerization, post treatment and drying were conducted by adding water and NMP to give the same polymerization conditions as in Example 1 except that hydrated sodium sulfide (water content: 54.0 wt.%), DCBP and the reaction slurry ($S_2$) were charged into a 1-l autoclave to give the respective ratios of (b) recurring units

to (a) recurring units

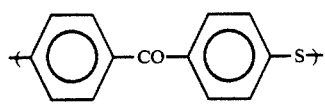

given in Table 1.

Physical properties of block copolymers

The measurement results are summarized in Table 1. Incidentally, the melt viscosities of Block Copolymers $B_2$, $B_4$ and $B_8$ were 410 poises, 390 poises and 180 poises, respectively.

EXAMPLE 9

Production Process No. 1).

Polymerization was conducted under the same conditions as in Example 6 except that the polymerization temperature and time were changed from 260° C. and 2 hours to 230° C. and 5 hours. The reactor was cooled. The reaction mixture in the form of a slurry was taken out of the reactor and was passed through a screen having an opening size of 75 μm (200 mesh). No granular polymer was collected at all. That slurry was poured into about 3 liters of acetone to have the polymer precipitated. The thus-precipitated polymer was collected on a filter paper (class: 5A), washed twice with acetone and additionally twice with water. Acetone and water were removed to obtain the polymer in a wet form. The wet polymer was dried at 100° C. to obtain a block copolymer ($B_9$) as a fine powder. The melt viscosity of Block Copolymer $B_9$ was 35 poises.

The measurement results of physical properties and the like are collectively given in Table 1.

COMPARATIVE EXAMPLE 1

Synthesis of PTK homopolymer

A titanium-lined reactor was charged with 9.0 moles of DCBP, 9.0 moles of hydrated sodium sulfide (water content: 53.6 wt.%) and 9.0 kg of NMP. After the reactor being purged with nitrogen gas, the resultant mixture was maintained at 240° C. for 2 hours and at 260° C. for 30 minutes to react them (water content/NMP = 5.0 mol/kg). The reactor was cooled, and the reaction mixture in the form of a slurry was taken out of the reactor. A portion of the slurry was passed through a screen having an opening size of 75 μm (200 mesh). However, no granular polymer was collected at all.

The remaining slurry was poured into about 20 liters of acetone to have the resultant polymer precipitated. The polymer was collected by filtration, and then washed twice with acetone and additionally twice with water. Acetone and water were removed to obtain the polymer in a wet form. The wet polymer was dried at 80° C. for 24 hours under reduced pressure, thereby obtaining a polymer ($R_1$) as an ivory powder.

The particle size of Polymer $R_1$ thus obtained was measured by an image analyzer ("OMNICON", trade mark; manufactured by Shimadzu Corp.). The average particle size was 10.6 μm. Particles not greater than 6 μm amounted to 60.5 wt.%. On the other hand, particles of 30 μm and greater accounted for 0.4 wt.% only. The bulk density of Polymer $R_1$ was 0.24 g/dl.

Polymer $R_1$ thus obtained was soluble in 98% concentrated sulfuric acid but was insoluble in α-chloronaphthalene even at 225° C.

COMPARATIVE EXAMPLE 2

Experimental granulation by co- and re-dissolution of homopolymers

A titanium-lined 1-l reactor was charged with 35 g of fine particulate PTK Polymer $R_1$ obtained in Comparative Example 1 and 65 g of poly(p-phenylene thioether) ("FORTRON #W214", trade name; product of Kureha Chemical Industry Co., Ltd.) and further with 500 g of NMP and 45 g of water. The contents were maintained at 260° C. for 2 hours. After cooling, the resultant slurry was passed through a screen having an opening size of 75 μm (200 mesh) to collect a particulate polymer.

From the filtrate, a fine particulate polymer was also collected using a filter paper (class: 5A).

The polymers thus collected were separately washed and dried in a similar manner to Example 1, thereby obtaining 51 g of granular Polymer $R_2$ and 37 g of fine particulate polymer.

Like poly(p-phenylene thioether), granular Polymer $R_2$ was insoluble in 98% concentrated sulfuric acid but soluble at 225° C. in α-chloronaphthalene. Its transition temperature was substantially the same as that of poly(p-phenylene thioether).

COMPARATIVE EXAMPLE 3

Synthesis of random copolymer

A titanium-lined 1-1 reactor was charged with 0.4 mole of DCBP, 0.5 mole of hydrated sodium sulfide (water content: 54.0 wt.%), 0.1 mole of PDCB and 500 g of NMP. They were reacted at 260° C. for 2 hours [water content/NMP=5 mol/kg, DCBP/PDCB=87/13 (weight ratio)].

The reaction mixture in the form of a slurry, said mixture containing a random copolymer ($R_3$), had a dark brown color and gave off an odor of decomposed polymers.

As a result of a gas chromatographic analysis, the remaining monomer was found to be PDCB. Its amount was equal to 33% of the amount charged. The slurry as the reaction mixture was passed through a screen having an opening size of 75 μm (200 mesh). It was however unable to collect any granular polymer.

COMPARATIVE EXAMPLE 4

Synthesis of random copolymer

Polymerization was conducted in a similar manner to Comparative Example 3 except that 0.1 mole of DCBP and 0.4 mole of PDCB were charged in lieu of 0.4 mole of DCBP and 0.1 mole of PDCB [water content/NMP= 5 mol/kg, DCBP/PDCB=30/70 (weight ratio)].

The reaction mixture in the form of a slurry had a dark red color and gave off an offensive odor. The slurry was passed through a screen having an opening size of 75 μm (200 mesh). It was however unable to collect any granular polymer. A fine powdery polymer was recovered from the filtrate by using a filter paper (class: 5A) and was then washed and dried in a similar manner to Example 1. Tm of the resulting random copolymer ($R_4$) was 240° C., which was much lower than the melting points of poly(p-phenylene thioether) and PTK homopolymer.

COMPARATIVE EXAMPLE 5

Experimental formation of granules by redissolution of PTK

A titanium-lined 1-1 reactor was charged with 106 g of the fine powdery PTK polymer obtained in Comparative Example 1 and also with 500 g of NMP and 45 g of water. The contents were maintained at 260° C. for 2 hours. After the reactor being cooled, the resulting slurry was passed through a screen having an opening size of 75 μm (200 mesh). It was however unable to collect any granular polymer.

COMPARATIVE EXAMPLE 6

Synthesis of PTK homopolymer

A titanium-lined 1-1 reactor was charged with 0.5 mole of DCBP, 0.5 mole of hydrated sodium sulfide (water content: 54.0 wt.%) and 500 g of NMP. After the reactor being purged with nitrogen gas, the contents were maintained at 260° C. for 2 hours to react them. The reactor was cooled and the reaction mixture in the form of a slurry was passed through a screen having an opening size of 75 μm (200 mesh). It was however unable to collect any granular polymer.

EXAMPLE 10

Production Process No. 2

A titanium-lined 1-1 reactor was charged with 0.531 mole of DCBP, 0.282 mole of hydrated sodium sulfide (water content: 54.0 wt.%), 77 g of water and 511 g of NMP. After the reactor being purged with nitrogen gas, the contents were maintained at 200° C. for 1 hours to react them (water content/NMP=about 11 mol/kg), whereby a reaction slurry ($KS_1$) containing a PTK prepolymer ($K_1$) was obtained.

Synthesis of block copolymer

A titanium-lined 1-1 reactor was charged with 489.5 g of Reaction Slurry $S_2$ containing PPTE Prepolymer $P_2$, 315.4 g of Reaction Slurry $KS_1$ containing PTK Prepolymer $K_1$ and 31.7 g of water. After the reactor being purged with nitrogen gas, the contents were maintained at 260° C. for 2 hours.

The reaction conditions upon synthesis of the block copolymer were as follows:

(1) The molar ratio of the total amount of the charged dihalogenated aromatic compounds [the sum of the amount of PDCB charged upon synthesis of Prepolymer $P_2$ and the amount of DCBP charged upon synthesis of PTK Prepolymer $K_1$] to the total amount of the charged alkali metal sulfide [the sum of the amount of sodium sulfide charged upon synthesis of Prepolymer $P_2$ and the amount of sodium sulfide charged upon synthesis of PTK Prepolymer $K_1$] was 1.04.
(2) The ratio of PATE blocks to PTK blocks was 58:42 (weight ratio).
(3) The ratio of the water content to the organic amide (NMP) was about 9.5 mol/kg.

Collection of block copolymer

The resultant reaction mixture in the form of a slurry was diluted with a substantially equiamount of NMP and the granular polymer thus obtained was collected by a screen having an opening size of 150 μm (100 mesh). The polymer was washed three times with NMP and further three times with water, and then dried at 100° C. for 24 hours under reduced pressure to obtain a pearl-like block copolymer ($B_{10}$) having an average size of 683 μm. The collection rate of the block copolymer ($B_{10}$) was 78%.

Physical properties of block copolymer

The melt viscosity of Block Copolymer ($B_{10}$) was 199 poises. Its Tmc, ΔHmc and the like are collectively shown in Table 1.

TABLE 1

| Poly-mer code | PATE recurring units/ PTK recurring units | | Transition temp. (°C.) | | Crystallinity · melt stability | | | | Collection rate of polymer (%) Screen opening | | Col-lect-ability | Remarks |
|---|---|---|---|---|---|---|---|---|---|---|---|---|
| | Charged value (weight ratio) | Analyzed value (weight ratio) | $Tg^{1)}$ | $Tm^{2)}$ | [400° C.] Tmc (°C.) | ΔHmc (J/g) | [400° C./ 10 min] Tmc (°C.) | ΔHmc (J/g) | 150 μm | 75 μm | | |
| Ex. 1 $B_1$ | 1.9(65/35) | 2.3(70/30) | 95 | 331/293 | 260 | 50 | 226 | 42 | 80 | — | Ex-cellent | Produc-tion Pro-cess No. 1 |
| Ex. 2 $B_2$ | 0.1(13/87) | 0.2(14/86) | 125 | 348 | 301 | 55 | 240 | 44 | — | <10 | Fair | Produc-tion Pro-cess No. 1 |
| Ex. 3 $B_3$ | 0.3(25/75) | 0.4(26/74) | 117 | 344 | 285 | 53 | 240 | 42 | — | 54 | Good | Produc-tion Pro-cess No. 1 |
| Ex. 4 $B_4$ | 0.7(40/60) | 0.7(42/58) | 110 | 339 | 280 | 54 | 237 | 43 | — | 70 | Good | Produc-tion Pro-cess No. 1 |
| Ex. 5 $B_5$ | 1.0(50/50) | 1.1(53/47) | 106 | 326 | 271 | 50 | 233 | 42 | 72 | — | Ex-cellent | Produc-tion Pro-cess No. 1 |
| Ex. 6 $B_6$ | 1.5(60/40) | 1.7(63/37) | 103 | 324/295 | 265 | 50 | 234 | 41 | 70 | — | Ex-cellent | Produc-tion Pro-cess No. 1 |
| Ex. 7 $B_7$ | 2.3(70/30) | 2.6(72/28) | 95 | 320/293 | 258 | 48 | 225 | 40 | 80 | — | Ex-cellent | Produc-tion Pro-cess No. 1 |
| Ex. 8 $B_8$ | 4.0(80/20) | 4.3(81/19) | 92 | 318/293 | 250 | 45 | 223 | 35 | 86 | — | Ex-cellent | Produc-tion Pro-cess No. 1 |
| Ex. 9 $B_9$ | 1.5(60/40) | 1.6(61/39) | 103 | 322/294 | 268 | 53 | 242 | 45 | 0 | 0 | Poor | Fine powder |
| Ex. 10 $B_{10}$ | 1.4(58/42) | 1.6(62/38) | 101 | 326/296 | 260 | 51 | 218 | 34 | 78 | — | Ex-cellent | Produc-tion Pro-cess No. 2 |
| Comp. Ex. 1 $R_1$ | 0(0/100) | Homo-polymer | 135 | 360 | 320 | 60 | 313 | 55 | 0 | 0 | Poor | Fine powder |
| Comp. Ex. 2 $R_2$ | 1.9(65/35) | Blend | 86 | 293 (PATE) | — | — | — | — | 58 | — | Good | PATE alone collected as gran-ules |
| Comp. Ex. 3 $R_3$ | 0.1(11/89) | Random copolymer (uncollect-able) | — | — | — | — | — | — | 0 | 0 | Poor | Offensive odor. Poor copoly-meriz-ability |
| Comp. Ex. 4 $R_4$ | 2.0(67/33) | Random copolymer | — | 240 | — | — | — | — | 0 | 0 | Poor | Offensive odor |
| Comp. Ex. 5 $R_5$ | 0(0/100) | Homo-polymer | 140 | 363 | — | — | — | — | 0 | 0 | Poor | Fine powder |
| Ref. Ex. 3) | (100/0) | PATE homopolymer | 85 | 293 | 238 | 30 | 218 | 25 | — | — | — | Granular |

1)Glass transition temperature, Tg as determined by DSC at a heating rate of 10° C./min by using a quench-pressed sheet (pressed at 380° C.) as a sample.
2)Melting point, Tm as determined by DSC at a heating rate of 10° C./min.
3)"FORTRON #W214", poly(p-phenylene thioether) produced by Kureha Chemical Industry Co., Ltd.

EXAMPLE 11 Production Process No. 2

Synthesis of PATE prepolymer

A titanium-lined reactor was charged with 3.2 kg of hydrated sodium sulfide (water content: 53.7 wt.%) and 6.0 kg of NMP. While gradually heating the contents to 200° C. under a nitrogen gas atmosphere, 2.541 kg of an NMP solution containing 1.326 kg of water and 0.38 mole of hydrogen sulfide were distilled out. Then, 0.123 kg of water was added, followed by the feeding of a mixed solution of 2.35 kg of PDCB and 4.51 kg of NMP. Polymerization was conducted at 220° C. for 10 hours (PDCB/sodium sulfide =0.86 mol/mol, water content/NMP =about 3 mol/kg), thereby obtaining a reaction slurry ($S_3$) containing a PPTE prepolymer ($P_3$). The number average molecular weight a Prepolymer $P_3$ was 1530 (average polymerization degree: 14).

Synthesis of PTK prepolymer

A titanium-lined 20-l reactor was charged with 3.640 moles of DCBP, 2.039 moles of hydrated sodium sulfide (water content: 53.7 wt.%), 176 g of water and 4.004 kg of NMP. After the reactor being purged with nitrogen gas, the contents were maintained at 220° C. for 1 hour (water content/NMP =about 5 mol/kg) to obtain a reaction slurry (KS$_2$) containing a PTK prepolymer (K$_2$).

Synthesis of block copolymer

A charge pot equipped with a heater was mounted on the titanium-lined 20-1 reactor with Reaction Slurry KS$_2$ containing PTK Prepolymer K$_2$ (temperature of slurry: 220° C.). The pot was charged with 9.12 kg of Reaction Slurry S$_3$ containing PPTE Prepolymer P$_3$. After Reaction Slurry S$_3$ being heated to 220° C., the reactor was charged with Reaction Slurry S$_3$ and then with 1146 g of water. The contents were thereafter mixed.

The contents were maintained at 260° C. for 2 hours. After the contents being allowed to cool down to 240° C., a final treatment of the reaction was conducted. The final stabilizing treatment of the reaction was effected by adding 0.4356 mole of DCBP and 0.5 kg of NMP and then reacting the contents at 240° C. for 0.2 hour.

The reaction conditions upon synthesis of the block copolymer were as follows:
(1) The molar ratio of the total amount of the charged dihalogenated aromatic compounds [the sum of the amount of PDCB charged upon synthesis of Prepolymer P$_3$ and the amount of DCBP charged upon synthesis of PTK Prepolymer K$_2$] to the total amount of the charged alkali metal sulfide [the sum of the amount of sodium sulfide charged upon synthesis of Prepolymer P$_3$ and the amount of sodium sulfide charged upon synthesis of PTK Prepolymer K$_2$] was 0.99.
(2) The ratio of PATE blocks to PTK blocks was approximately 60:40 (weight ratio).
(3) The ratio of the water content to the organic amide (NMP) was about 10 mol/kg.

Collection of block copolymer

Collection was conducted in a similar manner to Example 10, thereby obtaining a block copolymer (B$_{11}$) The collection rate was 78%. (Physical properties of block copolymer)

Physical properties of Block Copolymer B$_{11}$ were as follows:
Melt viscosity: 650 poises.
Transition temperature:
Tg: 104° C.
Tm: 301° C. and 324° C.
Melt crystallization temperature:
Tmc (400° C.): 252° C.
Tmc (400° C./10 min): 221° C.
Melt crystallization enthalpy:
ΔHmc (400° C.): 43 J/g.
Residual melt crystallization enthalpy:
ΔHmc (400° C./10 min): 36 J/g.

Incidentally, the ratio (weight ratio) of the sum of PATE recurring units to the sum of PTK recurring units was 1.6 (62/38).

Solubility of block copolymers in solvent

Block Copolymer B$_{11}$, Block Copolymer B$_1$ synthesized in Example 1, PTK Homopolymer R$_1$ synthesized in COMPARATIVE EXAMPLE 1 and poly(p-phenylene thioether) ("FORTRON #W214"; product of Kureha Chemical Industry Co., Ltd.) were separately hot-pressed and then cooled to form amorphous sheets. The respective amorphous sheets were placed in the solvents shown in Table 2 to investigate their dissolution behavior.

As given in Table 2, the block copolymers have properties different from PTK homopolymer and poly(p-phenylene thioether) which are homopolymers of the components of the block copolymers.

TABLE 2

| | Solvent | | | | | | |
|---|---|---|---|---|---|---|---|
| | 98 wt. % conc. sulfuric acid | α-chloronaphthalene | | p-Chlorophenol/1,2,4-trichlorobenzene mixed solvent (50/50 weight ratio) | | | |
| Dissolution temperature | Room temperature | Room temperature | 225° C. | Room temperature | 190° C. | 190° C.[1] →room temp. | 190° C.[2] →150° C. |
| Polymer | | | | | | | |
| Block copolymer, B$_{11}$ | X | X | X | X | ○ | Precipitated | ○ |
| Block copolymer, B$_1$ | X | X | X | X | ○ | Precipitated | ○ |
| PTK homopolymer, R$_1$ | ○ | X | X | X | ○ | ○ | ○ |
| Poly(p-phenylene thioether) | X | X | ○ | X | X | X | X |

X: Insoluble
○: Soluble (to complete clearness to the vision).
[1]State when maintained at room temperature for 2 hours after a solubilizing operation was conducted at 190° C. for 5 minutes.
[2]State when maintained at 150° C. for 2 hours after a solubilizing operation was conducted at 190° C. for 5 minutes.

EXAMPLE 12 Production Process No. 2

A block copolymer (B$_{12}$) was obtained by conducting a reaction and a final treatment in a similar manner to Example 11 except that the ratio of the charged amount of PDCB to the charged amount of sodium sulfide upon synthesis of a PATE prepolymer was changed to 0.94 (mol/mol) and the ratio of the charged amount of DCBP to the charged amount of sodium sulfide upon synthesis of a PTK prepolymer was also adjusted to control the molar ratio of the total amount of the charged dihalogenated aromatic compound to the total amount of the charged alkali metal sulfide upon synthesis of the block copolymer to 1.01. The collection rate was 77%.

Physical properties of block copolymer

Physical properties of Block Copolymer B$_{12}$ were as follows:
Melt viscosity: 350 poises.
Melt crystallization temperature:
Tmc (400° C./10 min): 228° C.
Residual melt crystallization enthalpy:
ΔHmc (400° C./10 min): 40 J/g.

Incidentally, the ratio (weight ratio) of the sum of PATE recurring units to the sum of PTK recurring units was 1.3 (63/47).

EXAMPLE 13

Melt stabilization (1) of block copolymer by the addition of stabilizer

The melt stability of Block Copolymer $B_1$ synthesized in Example 1 was investigated by adding various basic compounds thereto.

Namely, the various basic compounds were separately added as dry powders to Block Copolymer $B_1$. Each mixture was blended in a tumbler blender and then charged into a single-screw extruder having a cylinder diameter of 19 mm and an L/D ratio of 25. It was molten and kneaded at a cylinder temperature of 350° C. and thereafter extruded in the form of strands. The strands were cooled and then chopped. Thus, pellet samples of the mixtures of the block copolymer and the individual basic compounds were prepared. They were used as samples for the evaluation of melt stability.

Evaluation of the melt stability of each stabilizer-added pellet sample was conducted in the following manner. Namely, about 20 g of the pellet were placed in a barrel of Capirograph, which was heated at 350° C. Melt viscosities $\eta^*_5$, $\eta^*_{30}$ and $\eta^*_{60}$ upon elapsed time of 5 minutes, 30 minutes and 60 minutes, respectively were measured at a shear rate of 1200 sec$^{-1}$ to determine $\eta^*_{30}/\eta^*_5$ and $\eta^*_{60}/\eta^*_5$. As these ratios become closer to 1, better melt stability is indicated. In addition, the respective melt viscosities and their ratios were also determined with respect to Block Copolymer $B_1$ not added with any basic compound.

The results are collectively shown in Table 3.

Comparative Example 7

Industry Co., Ltd.; inherent viscosity, $\eta_{inh}$: 0.48 as measured at 208° C. and at a concentration of 0.4 g/dl in 1-chloronaphthalene). Its $\eta^*_5$ and $\eta^*_{30}$ and $\eta^*_{30}/\eta n^*_5$ were then determined (Experiment No. 7-4).

The results are collectively shown in Table 3.

Incidentally, PTK-1 employed in Experiment No. 7-3 was synthesized in the following manner.

A titanium-lined reactor was charged with 90 moles of DCBP, 90 moles of hydrated sodium sulfide (water content: 53.6 wt.%) and 90 kg of NMP (water content/NMP = 5 mol/kg). After the reactor being purged with nitrogen gas, the contents were heated from room temperature to 240° C. over 1.5 hours and were then maintained at 240° C. for 2 hours to react them. Thereafter, to effect a stabilization treatment in a final stage of the reaction, 4.5 moles of DCBP, 18 kg of NMP and 90 moles of water were added, followed by a reaction at 240° C. for further 1 hour.

The reactor was cooled and the reaction mixture in the form of a slurry was taken out of the reactor. The slurry was poured into about 200 l of acetone to have the resultant polymer precipitated. The thus precipitated polymer was collected by filtration and washed twice with acetone and additionally twice with water. Acetone and water were removed to obtain the polymer in a wet form.

The wet polymer thus obtained was dried at 100° C. for 12 hours under reduced pressure to obtain PTK-1. The melting point of that PTK-1 (powder) was 360° C.

Further, the reduced viscosity $\eta_{red}$ of PTK-1 as measured at 25° C. by a Ubbelohde's viscometer after dissolving the PTK-1 at a concentration of 0.5 g/dl in 98% sulfuric acid was 0.63 dl/g.

TABLE 3

| | Example 13 | | | | | | Comparative Example 7 | | | |
|---|---|---|---|---|---|---|---|---|---|---|
| Experiment No. | 13-1 | 13-2 | 13-3 | 13-4 | 13-5 | 13-6 | 7-1 | 7-2 | 7-3 | 7-4 |
| Block copolymer, $B_1$ (wt. parts) | 100 | 100 | 100 | 100 | 100 | 100 | 100 | 100 | PTK-1[1] 100 | PATE[2] 100 |
| Stabilizer (wt. parts) | $Ca(OH)_2$ 0 | $Ca(OH)_2$ 0.2 | $Ca(OH)_2$ 0.5 | $Li_2CO_3$ 0.5 | CaO 0.5 | $Ba(OH)_2$ 1.0 | NaCl 0.5 | Calcium stearate 0.5 | $Ca(OH)_2$ 0.5 | $Ca(OH)_2$ 0.5 |
| Melt stability (350° C., 1200 sec$^{-1}$) | | | | | | | | | | |
| $\eta_{30}^*/\eta_5^*$ | 1.3 | 0.9 | 0.9 | 1.0 | 0.9 | 1.0 | 1.3 | —[3] | 1.0[4] | 0.4 |
| $\eta_{60}^*/\eta_5^*$ | 3.5 | 1.1 | 1.0 | 1.1 | 1.2 | 1.1 | 3.9 | —[3] | 1.1[4] | — |

[1] Poly(arylene thioether-ketone) (reduced viscosity $\eta_{red}$: 0.63 dl/g as measured at 25° C. and a polymer concentration of 0.5 g/dl in 98% concentrated sulfuric acid.)
[2] Poly(p-phenylene thioether) (product of Kureha Chemical Industry Co., Ltd.; inherent viscosity $\eta_{inh}$: 0.48 as measured at 208° C. at a polymer concentration of 0.4 g/dl in 1-chloronaphthalene.)
[3] Measurement was discontinued due to violent foaming.
[4] Measured at 370° C. and 1200 sec.

Still further pellet samples were prepared in a similar manner to Example 13 except for the addition of NaCl and calcium stearate as additives, respectively. The respective melt viscosities of each pellet sample and their ratios were determined (Experiment Nos. 7-1 and 7-2).

A still further pellet sample was prepared in a similar manner to Example 13 except that a composition obtained by adding 0.5 part by weight of calcium hydroxide to 100 parts by weight of poly(arylene thioether-ketone) homopolymer (PTK-1) and the cylinder temperature was changed to 370° C. The respective melt viscosities and their ratios were determined (Experiment No. 7-3).

A still further pellet sample was prepared in a similar manner to Example 13 except for the use of a composition obtained by adding 0.5 part by weight of calcium hydroxide to 100 parts by weight of poly(paraphenylene thioether) which was PATE containing no ketone groups in the molecule (product of Kureha Chemical As is apparent from Experiment No. 13-1 of Table 3, the block copolymer according to this invention exhibited good melt stability without any stabilizer because its melt viscosity was substantially unchanged even when it was maintained for 30 minutes at 350° C. which is close to the melt processing temperature.

It is envisaged from Experiment Nos. 13-2 to 13-6 that the melt stability of the block copolymer can be improved further by the addition of a basic compound and the melt viscosity remains substantially unchanged even when maintained at 350° C. for 60 minutes. In addition, the deposition of decomposition products to the barrel of Capirograph was reduced.

On the other hand, it is understood from Experiment Nos. 7-1 and 7-2 that the addition of NaCl or calcium stearate does not bring about melt stabilization effect or induces foaming to conversely impair the melt stability.

Although melt stabilization effect is observed from the addition of calcium hydroxide in the case of PTK homopolymer (Experiment No. 7-3), the melt stability was conversely deteriorated in the case of PATE homopolymer because $\eta^*_{30}/\eta^*_5$ of its pellets extruded without addition of any basic compound was 0.7 while $\eta^*_{30}/\eta^*_5$ of its pellets extruded after addition of calcium hydroxide was 0.4 (Experiment No. 7-4).

EXAMPLE 14

Melt stabilization (2) of block copolymers by the addition of stabilizer

Employed as block copolymers were Block Copolymer $B_1$ synthesized in Example 1 and Block Copolymer $B_{11}$ synthesized in Example 11. Those polymers were added with the basic compound or the basic compound and antioxidants shown in Table 4, and pellet samples were prepared therefrom in a similar manner to Example 13. Their melt stabilities were then investigated. In order to conduct evaluation by enlarging differences in melt stability among the samples, values of melt viscosity as measured at 370° C. and a shear rate of 1200 sec$^{-1}$ were used in addition to the evaluation conditions of 350° C. and the shear rate of 1200 sec$^{-1}$.

The measurement results are given in Table 4.

As is clearly envisaged from Table 4, the melt stability of each block copolymer of this invention has been improved by the addition of the basic compound either alone or in combination with the antioxidant. Further, the deposition of decomposition products on the barrel of Capirograph was also reduced substantially.

Incidentally, the individual antioxidant used in Table 4 are a follows:

Phosphorus compounds:
(a) PEP 36: product of Adeka Argus Chemical Co., Ltd.; bis-(2,6-di-tert-butyl-4-methylphenyl)pentaerythritoldiphosphite.
(b) IRGAFOS 168: product of Ciba-Geigy AG; tris(2,4-di-tert-butylphenyl)phosphite.
(c) SANDSTAB P-EPQ: product of Sandoz AG; phosphorus acid[1,1-biphenyl-4,4'-diyl-bistetrakis [2,4-bis(1,1-dimethylethyl)phenyl]ester].
(d) WESTON 618: product of Borg-Warner Corporation; distearyl pentaerythritol diphosphite.

Hindered phenol compound:
(e) AO-220: product of Adeka Argus Chemical Co., Ltd.; a compound analogous to 1,3,5-trimethyl-2,4,6-tris-(3,5-di-tert-butyl-4-hydroxybenzyl)benzene.

Hindered amine compound:
(f) CHIMASSORB 944 LD: product of Ciba-Geigy AG; poly[[6-(1,1,3,3-tetramethylbutyl)imino1,3,5-triazine-2,4-diil] [(2,2,6,6-tetramethyl-4-piperidyl)imino]hexamethylene[(2,2,6,6-tetramethyl-4-piperidyl)imino]].

TABLE 4

| Experiment No. | 14-1 | 14-2 | 14-3 | 14-4 | 14-5 | 14-6 |
|---|---|---|---|---|---|---|
| Block copolymer (wt. parts) | $B_1$ 100 | $B_1$ 100 | $B_1$ 100 | $B_1$ 100 | $B_1$ 100 | $B_1$ 100 |
| Stabilizer-Basic compound (wt. parts) | Ca(OH)$_2$ 0 | Ca(OH)$_2$ 0.5 | Ca(OH)$_2$ 1.0 | Ca(OH)$_2$ 1.5 | Ca(OH)$_2$ 1.0 | Ca(OH)$_2$ 1.0 |
| Antioxidant (wt. parts) | — | — | — | — | Phosphorus comp'd (a) 0.5 | Phosphorus comp'd (b) 0.5 |
| Melt stability (370° C., 1200 sec$^{-1}$) | | | | | | |
| $\eta_{30}^*/\eta_5^*$ | 25.4 | 0.90 | 1.04 | 0.93 | 1.08 | 0.84 |
| $\eta_{60}^*/\eta_5^*$ | — | 1.70 | 1.80 | 1.50 | 1.08 | 1.07 |
| 350° C., 1200 sec$^{-1}$ | | | | | | |
| $\eta_{30}^*/\eta_5^*$ | 1.2 | 0.9 | 1.01 | 0.98 | 1.01 | — |
| $\eta_{60}^*/\eta_5^*$ | 3.4 | 0.9 | 1.02 | 1.04 | 1.03 | — |

| Experiment No. | 14-7 | 14-8 | 14-9 | 14-10 | 14-11 | 14-12 |
|---|---|---|---|---|---|---|
| Block copolymer (wt. parts) | $B_1$ 100 | $B_1$ 100 | $B_1$ 100 | $B_1$ 100 | $B_{11}$ 100 | $B_{11}$ 100 |
| Stabilizer-Basic compound (wt. parts) | Ca(OH)$_2$ 1.0 | Ca(OH)$_2$ 1.0 | Ca(OH)$_2$ 1.0 | Ca(OH)$_2$ 1.0 | Ca(OH)$_2$ 1.0 | Ca(OH)$_2$ 1.0 |
| Antioxidant (wt. parts) | Phosphorus comp'd (c) 0.5 | Phosphorus comp'd (d) 0.5 | Phenol comp'd (e) 0.5 | Amine comp'd (f) 0.5 | Phosphorus comp'd (a) 0.5 | Phosphorus comp'd (b) 0.5 |
| Melt stability (370° C., 1200 sec$^{-1}$) | | | | | | |
| $\eta_{30}^*/\eta_5^*$ | 0.86 | 0.88 | 0.96 | 0.80 | 0.99 | 1.01 |
| $\eta_{60}^*/\eta_5^*$ | 1.07 | 1.06 | 1.25 | 0.85 | 1.03 | 1.02 |
| (350° C., 1200 sec$^{-1}$) | | | | | | |
| $\eta_{30}^*/\eta_5^*$ | — | — | — | — | — | — |
| $\eta_{60}^*/\eta_5^*$ | — | — | — | — | — | — |

EXAMPLE 15

Molding experiment (1) using block copolymer

Using Block Copolymer $B_1$ synthesized in Example 1, pellet samples were prepared in accordance with the compositions shown in Table 5, respectively.

Each of those pellet samples was charged into an injection molding machine under a nitrogen gas stream, and was then injection-molded at a cylinder temperature of 350° C., a mold temperature of 160° C., an injection holding pressure of 1000 kg/cm$^2$ and an injection cycle of about 40 seconds so that injection-molded products were obtained.

By the addition of the stabilizers, the long run property at the time of molding was improved so that the deposition of decomposition products to the molding machine was reduced.

The compositions and the physical properties and solvent resistance of the injection-molded products are summarized in Table 5.

TABLE 5

|  |  | Example 15 | | |
|---|---|---|---|---|
| Experiment No. | ASTM | 15-1 | 15-2 | 15-3 |
| Block copolymer | | | | |
| B₁ (wt. parts) | | 100 | 100 | 100 |
| Stabilizer (wt. parts) | | | | |
| Basic compound | | 0 | Ca(OH)₂ 0.5 | Ca(OH)₂ 0.5 |
| Antioxidant | | 0 | 0 | Phosphorus[1] compound 0.5 |
| Flexural strength (23° C.) [kg/mm²] | D790 | 8 | 7 | 8 |
| Flexural modulus (23° C.) [kg/mm²] | D790 | 310 | 310 | 300 |
| Heat distortion temperature (°C.) [18.6 kg/cm²] | D648 | 140 | 140 | 140 |
| Solvent resistance | | | | |
| α-Chloronaphthalene[2] | | Insoluble | Insoluble | Insoluble |
| NMP[3] | | Insoluble | Insoluble | Insoluble |
| 98% conc. H₂SO₄[4] | | Insoluble | Insoluble | Insoluble |

[1]"PEP 36"; product of Adeka Argus Chemical Co., Ltd.
[2]Immersed at 225° C. for 5 minutes.
[3]Immersed at 200° C. for 5 minutes.
[4]Immersed at room temperature for 30 minutes.

EXAMPLE 16

Extrusion experiment (2) using block copolymer

Using Block Copolymer B₁ synthesized in Example 1, pellet samples were prepared in accordance with the compositions shown in Table 6, respectively.

Each of those pellet samples was charged into a single-screw extruder having a cylinder diameter of 35 mm and equipped with a small T-die, and was then meltextruded at a cylinder temperature of 350° C. The extrudate was quenched by quenching rolls to prepare an unstretched film having an average thickness of 150 μm.

The unstretched films thus obtained were individually cut into pieces of 10 mm wide and 20 mm long. Their strengths and elongations were measured by using TENSILON (model: "RTM-100"; manufactured by ToyoBaldwin Co., Ltd.). The measurements were conducted at 23° C. and a deformation rate of 10 mm/min (50%/min).

By the addition of the stabilizers, the long run property at the time of extrusion was improved so that the deposition of decomposition products to the extruder and cooling rolls was reduced.

Incidentally, the solder resistance (10 sec) of each sample was expressed by the highest solder temperature at which changes in external appearance, such as swelling and wrinkling, were not developed when the sample was annealed at 200° C. for 2 hours and then immersed for 10 seconds in a solder bath. The temperature of the solder bath was controlled in 5° C. increments.

The results are summarized in Table 6.

TABLE 6

|  |  | Example 16 | | |
|---|---|---|---|---|
| Experiment No. | ASTM | 16-1 | 16-2 | 16-3 |
| Block copolymer | | | | |
| B₁ (wt. parts) | | 100 | 100 | 100 |
| Stabilizer (wt. parts) | | | | |
| Basic compound | | 0 | Ca(OH)₂ 0.5 | Ca(OH)₂ 0.3 |
| Antioxidant | | 0 | 0 | Phenol[1] compound 0.2 |
| Density[2] (25° C.) [g/cm³] | | | | |
| Amorphous sheet | | 1.30 | 1.30 | 1.30 |
| Crystallized product[3] | | 1.36 | 1.36 | 1.36 |
| Strength and elongation characteristics (23° C.) | | | | |
| Tensile strength at yield point [kg/mm²] | D638 | 6 | 6 | 6 |
| Tensile strength at break point [kg/mm²] | D638 | 4 | 5 | 5 |
| Tensile elongation at break (%) | D638 | 310 | 360 | 350 |
| Tensile modulus [kg/mm²] | D638 | 220 | 225 | 220 |
| Solder heat resistance [°C.] (immersed for 10 seconds in solder bath) | | >280 | >280 | >280 |
| Solvent resistance | | | | |
| α-Chloronaphthalene[4] | | Insoluble | Insoluble | Insoluble |
| NMP[5] | | Insoluble | Insoluble | Insoluble |
| 98% conc. H₂SO₄[6] | | Insoluble | Insoluble | Insoluble |

[1]"AO-220", product of Adeka Argus Chemical Co., Ltd.
[2]By lithium bromide/water system gradient tube density determination.
[3]Annealed at 280° C. for 30 minutes.
[4]Immersed at 225° C. for 5 minutes.
[5]Immersed at 200° C. for 5 minutes.
[6]Immersed at room temperature for 30 minutes.

We claim:

1. A poly(arylene thioether) block copolymer comprising (A) at least one poly(arylene thioetherketone) block (PTK block) having predominant recurring units of the formula

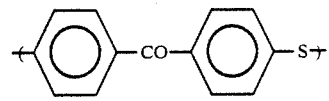

wherein the —CO— and —S— are in the para position to each other and (B) at least one poly(arylene thioether) block (PATE block) having predominant recurring units of the formula

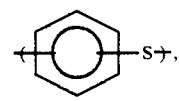

the TPK blocks (A) and the PATE blocks (B) alternating with one another, wherein
the weight ratio of the total amount of the PATE block (B) to the total amount of the PTK block (A) ranges from 0.05 to 4,
(b) the average polymerization degree of the PATE block (B) is at least 10,
(c) said block copolymer has a melt viscosity of 2–100,000 poises as measured at 350° C. and a shear rate of 1,200/sec, and (d) said block copolymer has a melt crystallization temperature, Tmc (400° C./10 min), of at least 170° C. and a residual melt crystallization enthalpy, ΔHmc (400° C./10 min), of at least 10 J/g, wherein Tmc (400° C./10 min) and ΔHmc (400° C./10 min) are determined by a differential scanning calorimeter at a cooling rate of 10° C./min after the block copolymer is held at 50° C. for 5 minutes in an inert gas atmosphere, heated to 400° C. at a rate of 75° C./min and then held for 10 minutes at 400° C.

2. The poly(arylene thioether) block copolymer as claimed in claim 1, wherein the PATE block (B) has predominant para-phenylene sulfide recurring units of the formula

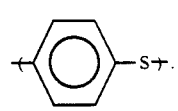

3. The poly(arylene thioether) block copolymer as claimed in claim 1, wherein the weight ratio of the total amount of the PATE block (B) to the total amount of the PTK block (A) is at least 0.05 but less than 1.

4. The poly(arylene thioether) block copolymer as claimed in claim 1, wherein the weight ratio of the total amount of the PATE block (B) to the total amount of the PTK block (A) is in a range of 1–5.

5. A formed product made of the poly(arylene thioether) block copolymer as claimed in claim 1.

6. The formed product as claimed in claim 5, which is an extruded product, an injection-molded product or an unstretched film.

* * * * *